US012674488B2

(12) United States Patent
Yin

(10) Patent No.: US 12,674,488 B2
(45) Date of Patent: Jul. 7, 2026

(54) MAGNETIC SUSPENSION DEVICE AND SEMICONDUCTOR PROCESSING APPARATUS

(71) Applicant: SUZHOU SUPERMAG INTELLIGENT TECHNOLOGY CO., LTD, Suzhou (CN)

(72) Inventor: Chengke Yin, Suzhou (CN)

(73) Assignee: SUZHOU SUPERMAG INTELLIGENT TECHNOLOGY CO., LTD, Suzhou (CN)

( * ) Notice: Subject to any disclaimer, the term of this patent is extended or adjusted under 35 U.S.C. 154(b) by 237 days.

(21) Appl. No.: 18/692,282

(22) PCT Filed: Nov. 9, 2022

(86) PCT No.: PCT/CN2022/130897
§ 371 (c)(1),
(2) Date: Mar. 14, 2024

(87) PCT Pub. No.: WO2023/207031
PCT Pub. Date: Nov. 2, 2023

(65) Prior Publication Data
US 2025/0137489 A1　May 1, 2025

(30) Foreign Application Priority Data
Apr. 25, 2022　(CN) .......................... 202210442450.0

(51) Int. Cl.
*H02K 7/09* (2006.01)
*F16C 32/04* (2006.01)
(52) U.S. Cl.
CPC ........... *F16C 32/0476* (2013.01); *H02K 7/09* (2013.01)

(58) Field of Classification Search
CPC .............. F16C 32/0476; F16C 32/0427; F16C 32/0465; F16C 2380/18; F16C 32/0406;
(Continued)

(56) References Cited

U.S. PATENT DOCUMENTS 8,169,118 B2 * 5/2012 Filatov .................. F16C 32/048
310/90.5
2010/0231076 A1 * 9/2010 Chiba ...................... H02K 7/09
310/90.5
(Continued)

FOREIGN PATENT DOCUMENTS

CN　104533950 A　4/2015
CN　105257698 A　1/2016
(Continued)

OTHER PUBLICATIONS

International Search Report for Chinese Application No. PCT/CN2022/130897 dated Jan. 20, 2023, English translation, two pages.
(Continued)

*Primary Examiner* — Thomas Truong
(74) *Attorney, Agent, or Firm* — Carter, DeLuca & Farrell LLP

(57) ABSTRACT

A magnetic levitation device and a semiconductor processing equipment are provided. The magnetic levitation device includes a rotor and a stator. The stator includes at least three magnetic stator substrates, a permanent magnet and a guiding magnet. The at least three magnetic stator substrates are spaced apart from each other to define at least two gaps, the permanent magnet and the guiding magnet are alternately arranged in the at least two gaps; the at least three magnetic stator substrates include a first magnetic stator substrate, a protrusion and a magnetic levitation coil of the first magnetic stator substrate apply an upward force along the axial direction of the stator on the rotor, and a ratio of the number
(Continued)

of the first magnetic stator substrate(s) to the total number of the at least three magnetic stator substrates is greater than or equal to 50%.

20 Claims, 13 Drawing Sheets

(58) Field of Classification Search
CPC ...... H01F 7/0236; H02N 15/00; H02K 1/146; H02K 1/17; H02K 3/522; H02K 2213/03; H02K 7/09; H01L 21/68785
See application file for complete search history.

(56) References Cited

U.S. PATENT DOCUMENTS

| | | | |
|---|---|---|---|
| 2014/0265698 A1 | 9/2014 | Tseng | |
| 2022/0106981 A1 | 4/2022 | Hsu et al. | |

FOREIGN PATENT DOCUMENTS

| | | | |
|---|---|---|---|
| CN | 105864292 | A | 8/2016 |
| CN | 104704626 | B | 12/2017 |
| CN | 109570599 | A | 4/2019 |
| CN | 109826867 | A | 5/2019 |
| CN | 112968559 | A | 6/2021 |
| CN | 213575190 | U | 6/2021 |
| CN | 114221580 | A | 3/2022 |
| CN | 114826025 | A | 7/2022 |
| JP | 2004072879 | A | 3/2004 |
| JP | 2010279230 | A | 12/2010 |
| JP | 4733405 | B2 | 7/2011 |
| JP | 2011158021 | A | 8/2011 |
| KR | 100423366 | B1 | 6/2004 |
| KR | 1020060065225 | A | 12/2004 |
| KR | 100523674 | B1 | 10/2005 |

OTHER PUBLICATIONS

Chinese Office Action for Application No. 202210442450.0 dated Jun. 13, 2025 with English translation, 16 pages.

* cited by examiner

202

203

MAGNETIC SUSPENSION DEVICE AND SEMICONDUCTOR PROCESSING APPARATUS

CROSS-REFERENCE TO RELATED APPLICATIONS

For all purposes, the present application is based on and claims the priority of China Patent Application No. 202210442450.0 filed on Apr. 25, 2022, and the present disclosure of the above-mentioned China Patent Application is hereby incorporated in its entirety as a part of the present application.

TECHNICAL FIELD

At least one embodiment of the present disclosure relates to the technical field of magnetic levitation, in particular to a magnetic levitation device.

BACKGROUND

Levitation technology mainly includes magnetic levitation, optical levitation, acoustic levitation, airflow levitation, electric levitation, particle beam levitation, etc., among which magnetic levitation technology has been developed more maturely. In the magnetic levitation technology, a magnetic interaction force between a stator and a rotor causes the rotor to be levitated and rotated uniformly. There is no contact or mechanical friction between the rotor and the stator, so that the magnetic levitation technology is especially suitable for occasions requiring for high cleanliness levels.

SUMMARY

According to an embodiments of the present disclosure, it is provided a magnetic levitation device, comprising: a rotor; and a stator, wherein the stator surrounds the rotor, or, the rotor surrounds the stator, wherein: the stator comprises at least three magnetic stator substrates, a permanent magnet and a guiding magnet, the at least three magnetic stator substrates are spaced apart from each other in an axial direction of the stator to define at least two gaps in the axial direction of the stator, the permanent magnet and the guiding magnet are alternately arranged in the at least two gaps in the axial direction of the stator; each of the at least three magnetic stator substrates comprises a substrate body and a protrusion connected with the substrate body, the protrusion is protruded from the permanent magnet and the guiding magnet towards the rotor, and a magnetic levitation coil is wound on the protrusion; and the at least three magnetic stator substrates comprise a first magnetic stator substrate, wherein a protrusion and a magnetic levitation coil of the first magnetic stator substrate apply an upward force along the axial direction of the stator on the rotor, and a ratio of the number of the first magnetic stator substrate(s) to the total number of the at least three magnetic stator substrates is greater than or equal to 50%.

For example, the at least three magnetic stator substrates further comprise a second magnetic stator substrate, a protrusion and a magnetic levitation coil of the second magnetic stator substrate apply a downward force along the axial direction of the stator on the rotor, and the number of the first magnetic stator substrate(s) is greater than or equal to the number of the second magnetic stator substrate(s).

For example, the number of the at least three magnetic stator substrates is four or more than four; and in the axial direction of the stator, opposite surfaces of two adjacent permanent magnets have the same magnetism.

For example, the stator comprises at least two permanent magnets, and magnetic fields of the at least two permanent magnets have the same magnetic-field intensity.

For example, the rotor comprises a rotor body and at least three flanges protruded from the rotor body towards the stator; the number of the at least three magnetic stator substrates is equal to the number of the at least three flanges, and the at least three magnetic stator substrates are in one-to-one correspondence with the at least three flanges; and the at least three flanges comprise a first flange corresponding to the first magnetic stator substrate, and a center line of the protrusion of the first magnetic stator substrate in the axial direction of the stator is higher than a center line of the first flange in the axial direction of the stator.

For example, the center line of the protrusion of the first magnetic stator substrate in the axial direction is higher than the center line of the first flange in the axial direction comprises one of the following situations: (i) in the axial direction of the stator, an upper surface of the protrusion of the first magnetic stator substrate is higher than an upper surface of the first flange, and a lower surface of the protrusion of the first magnetic stator substrate is higher than the upper surface of the first flange or is at the same height as the upper surface of the first flange; (ii) in the axial direction of the stator, the upper surface of the protrusion of the first magnetic stator substrate is higher than the upper surface of the first flange or is at the same height as the upper surface of the first flange, and a lower surface of the first flange is lower than the lower surface of the protrusion of the first magnetic stator substrate, and the upper surface of the first flange is higher than the lower surface of the protrusion of the first magnetic stator substrate; (iii) in the axial direction of the stator, the upper surface of the protrusion of the first magnetic stator substrate is higher than the upper surface of the first flange, and the lower surface of the first flange is higher than the lower surface of the protrusion of the first magnetic stator substrate or is at the same height as the lower surface of the protrusion of the first magnetic stator substrate; and (iv) in the axial direction of the stator, the upper surface of the protrusion of the first magnetic stator substrate is at the same height as the upper surface of the first flange or is lower than the upper surface of the first flange, and the lower surface of the protrusion of the first magnetic stator substrate is higher than the lower surface of the first flange.

For example, in the situation (ii), a distance between the upper surface of the protrusion of the first magnetic stator substrate and the upper surface of the first flange is H, and $H \leq \frac{1}{3} Ha$, wherein Ha is a size of the first flange in the axial direction of the stator.

For example, $H \leq \frac{1}{5} Ha$.

For example, the at least three flanges comprise a second flange corresponding to the second magnetic stator substrate, and a center line of the second flange in the axial direction of the stator is higher than a center line of the protrusion of the second magnetic stator substrate in the axial direction of the stator.

For example, the center line of the second flange in the axial direction is higher than the center line of the protrusion of the second magnetic stator substrate in the axial direction comprises one of the following situations: (i) in the axial direction of the stator, an upper surface of the second flange is higher than an upper surface of the protrusion of the second magnetic stator substrate, and a lower surface of the second flange is higher than the upper surface of the protrusion of the second magnetic stator substrate or is at the same height as the upper surface of the protrusion of the second magnetic stator substrate; (ii) in the axial direction of the stator, the upper surface of the second flange is higher than the upper surface of the protrusion of the second magnetic stator substrate or is at the same height as the upper surface of the protrusion of the second magnetic stator substrate, and a lower surface of the protrusion of the second magnetic stator substrate is lower than the lower surface of the second flange, and the lower surface of the second flange is lower than the upper surface of the protrusion of the second magnetic stator substrate; (iii) in the axial direction of the stator, the upper surface of the second flange is higher than the upper surface of the protrusion of the second magnetic stator substrate, and the lower surface of the protrusion of the second magnetic stator substrate is higher than the lower surface of the second flange or is at the same height as the lower surface of the second flange; and (iv) in the axial direction of the stator, the upper surface of the second flange is at the same height as the upper surface of the protrusion of the second magnetic stator substrate or is lower than the upper surface of the protrusion of the second magnetic stator substrate, and the lower surface of the second flange is higher than the lower surface of the protrusion of the second magnetic stator substrate.

For example, in the situation (ii), a distance between the upper surface of the second flange and the upper surface of the protrusion of the second magnetic stator substrate is H and $H \leq \frac{4}{5}Ha$, wherein Ha is a size of the second flange in the axial direction of the stator.

For example, $H \leq \frac{1}{5}Ha$.

For example, a distance between each of the at least three magnetic stator substrates and a corresponding flange in a radial direction of the stator is L; a size of each of the at least two gaps in the axial direction of the stator is at least three times as great as L.

For example, the size of each of the at least two gaps in the axial direction of the stator is at least five times as great as L.

For example, the size of each of the at least two gaps in the axial direction of the stator is at least ten times as great as L.

For example, a distance between each of the at least three magnetic stator substrates and a corresponding flange in a radial direction of the stator is L and $L \leq Ha$, wherein Ha is a size of the flange in the axial direction of the stator.

For example, $L \leq \frac{1}{2}Ha$.

For example, at least one magnetic stator substrate of the at least three magnetic stator substrates comprises a plurality of teeth, the plurality of teeth are connected with the substrate body and are protruded from the permanent magnet and the guiding magnet towards the rotor, and a magnetic rotating coil is wound on each of the plurality of teeth.

For example, the magnetic levitation coil is arranged farther from the rotor than the magnetic rotating coil.

For example, the plurality of teeth are arranged at an end of the protrusion facing towards the rotor.

For example, the number of the at least one magnetic stator substrate is one, and the one magnetic stator substrate is a magnetic stator substrate located at an uppermost layer or a lowermost layer in the axial direction of the stator among the at least three magnetic stator substrates.

For example, the number of the at least one magnetic stator substrate is one, and the one magnetic stator substrate is a magnetic stator substrate located at a middle layer in the axial direction of the stator among the at least three magnetic stator substrates.

For example, the number of the at least one magnetic stator substrate is an even number, and the even number of magnetic stator substrates are symmetrically arranged with relative to a central line of the stator in the axial direction of the stator; or the number of the at least one magnetic stator substrate is an odd number greater than 1, wherein one of the at least one magnetic stator substrate is the magnetic stator substrate located at a middle layer in the axial direction of the stator among the at least three magnetic stator substrates, and the other magnetic stator substrates of the at least one magnetic stator substrate are symmetrically arranged with relative to a central line of the stator in the axial direction of the stator.

For example, the rotor comprises a rotor body and at least three flanges protruded from the rotor body towards the stator; the number of the at least three magnetic stator substrates is equal to the number of the at least three flanges, and the at least three magnetic stator substrates are in one-to-one correspondence with the at least three flanges; and an end of the flange corresponding to the at least one magnetic stator substrate that faces towards the at least one magnetic stator substrate has a plurality of teeth.

For example, the number of the first magnetic stator substrate(s) is at least two, and the number of the second magnetic stator substrate(s) is at least one.

For example, the number of the second magnetic stator substrate(s) is one.

For example, among at least two gaps, the permanent magnet is arranged in an odd-numbered gap counting from top to bottom in the axial direction of the stator, and the guiding magnet is arranged in an even-numbered gap counting from top to bottom in the axial direction of the stator.

For example, the permanent magnet is in direct contact with the magnetic stator substrate adjacent thereto, or the permanent magnet is spaced apart from the magnetic stator substrate adjacent thereto by an air gap, or a guiding magnet piece is inserted between the permanent magnet and the magnetic stator substrate adjacent thereto.

For example, the guiding magnet is in direct contact with the magnetic stator substrate adjacent thereto, or the guiding magnet is spaced apart from the magnetic stator substrate adjacent thereto by an air gap, or a guiding magnet piece is inserted between the guiding magnet and the magnetic stator substrate adjacent thereto.

For example, the at least three magnetic stator substrates are arranged at equal intervals in the axial direction of the stator.

For example, in the axial direction of the stator, a thickness of the permanent magnet is equal to a thickness of the guiding magnet.

For example, in the axial direction of the stator, the at least three magnetic stator substrates have the same thickness.

According to an embodiment of the present disclosure, it is provided a semiconductor processing equipment, which comprises the afore-mentioned magnetic levitation device.

BRIEF DESCRIPTION OF THE DRAWINGS

In order to more clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and in the case that the position of the object which is described is changed, the relative position relationship may be changed accordingly.

The drawings in the present disclosure are not drawn strictly to actual scales, and specific sizes and quantities of respective structures can be determined according to actual needs. The drawings described in the present disclosure are only schematic diagrams.

Embodiments of the present disclosure provide a magnetic levitation device. In the magnetic levitation device according to the embodiments of the present disclosure, a stator can apply a sufficiently large axial support force on a rotor, so that the rotor can be rotated and levitated stably even if the rotor itself has a considerable weight, and that the rotor can be rotated and levitated stably even if the rotor supports or lifts an article with a considerable weight, which allows for a very wider application range of the magnetic levitation device according to the embodiments of the present disclosure. The embodiments of the present disclosure further provide a semiconductor processing equipment including the magnetic levitation device according to the embodiments of the present disclosure.

Figure 1:
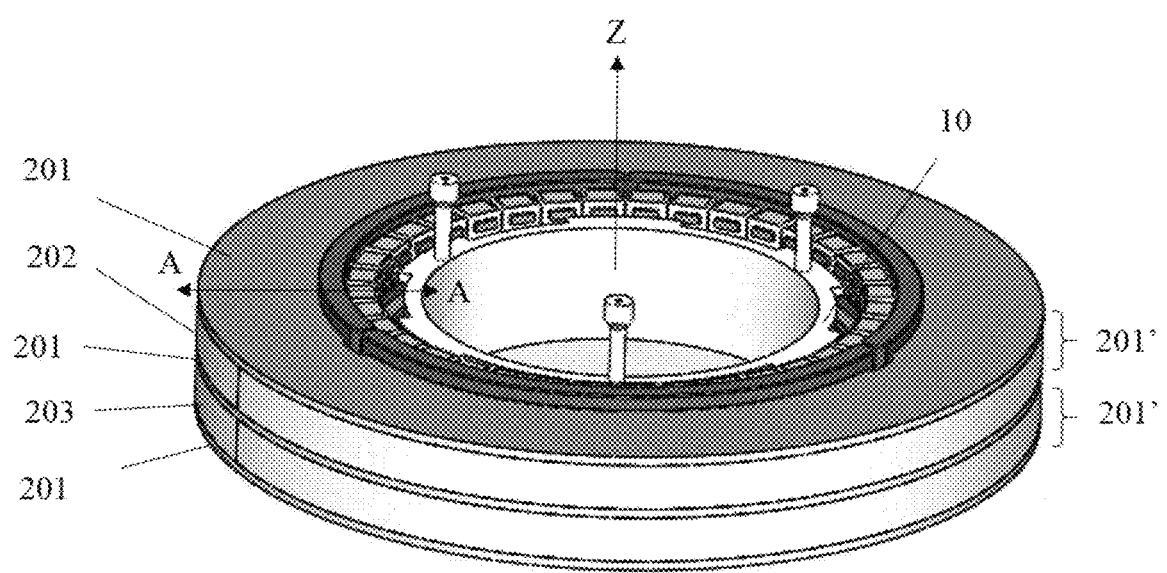
FIG. 1 is a schematic perspective diagram of a magnetic levitation device according to an embodiment of the present disclosure.
Figure 2:
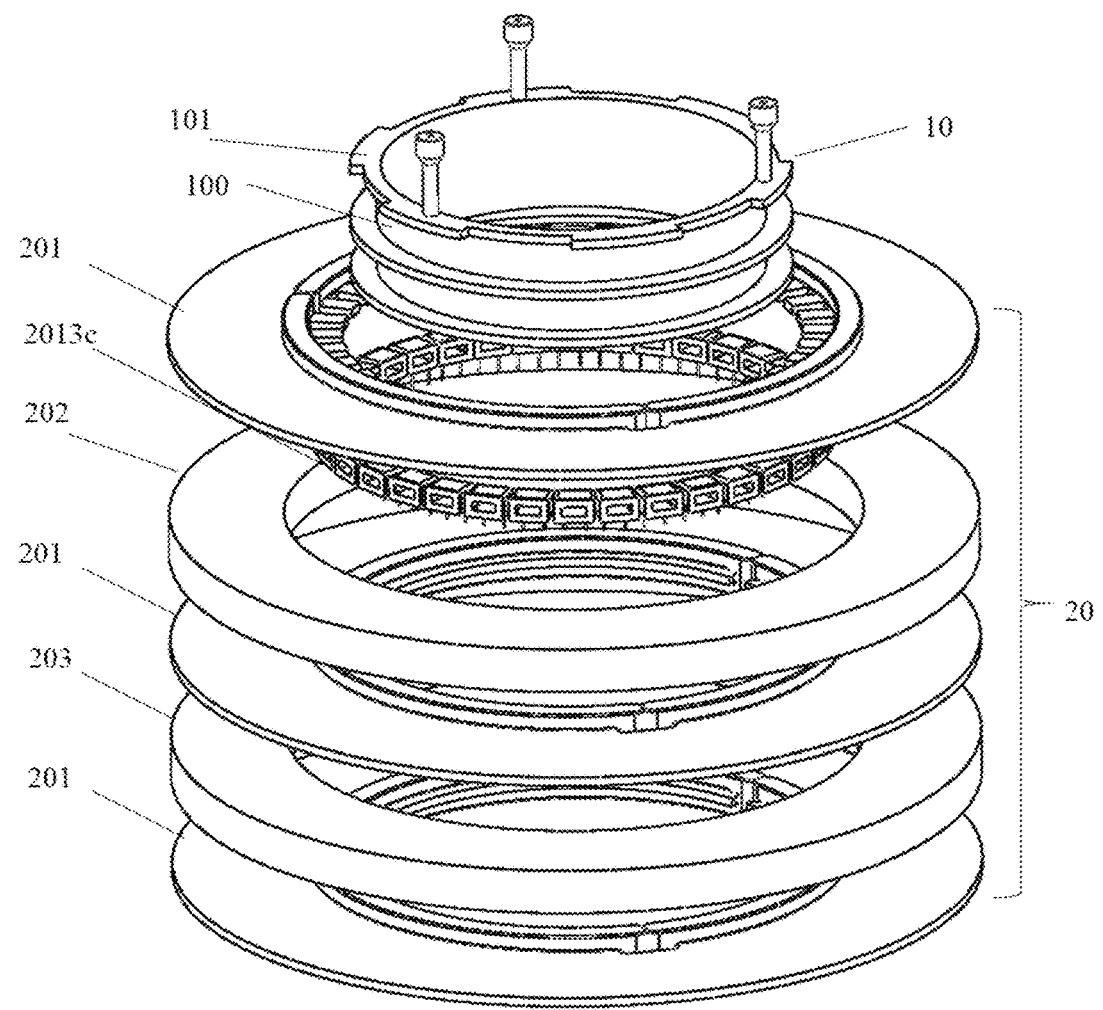
FIG. 2 is an exploded view of the magnetic levitation device illustrated in FIG. 1.
Figure 3:
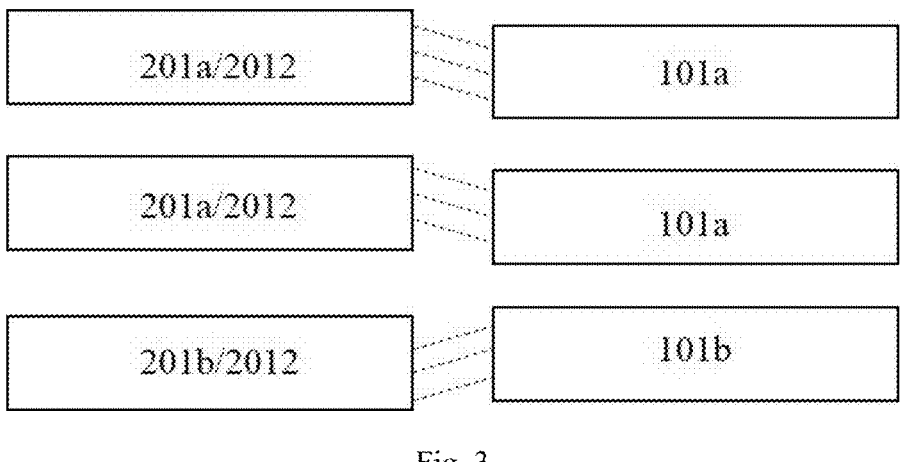
FIG. 3 is a schematic diagram illustrating an interaction force between a protrusion 2021 of a magnetic stator substrate and a flange of a rotor in the magnetic levitation device illustrated in FIG. 1.
Figure 4:
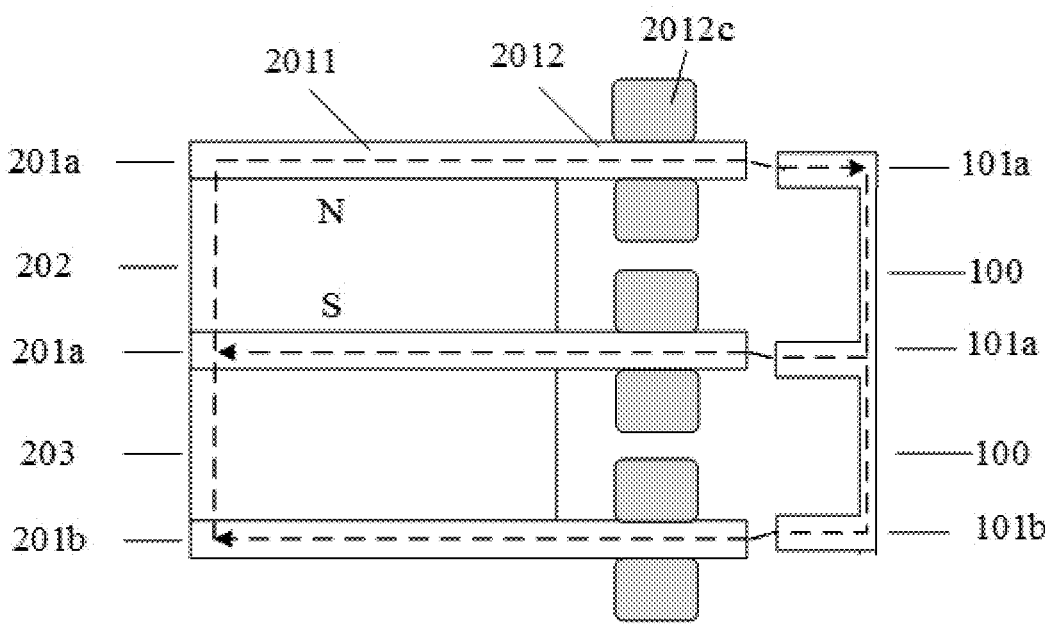
FIG. 4 is a schematic diagram illustrating magnetic force lines of the magnetic levitation device illustrated in FIG. 1.
Figure 9A:
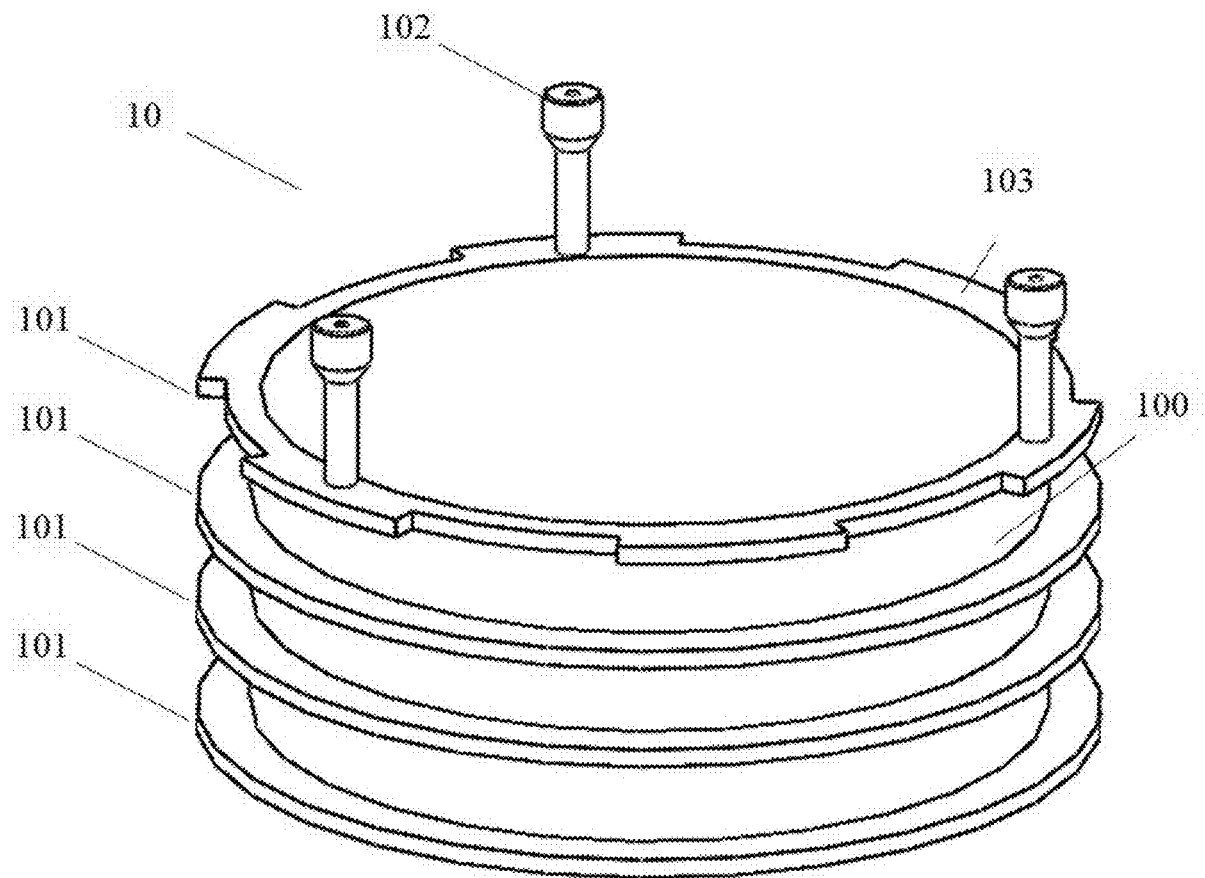
FIG. 9A is a schematic perspective diagram of a rotor of a magnetic levitation device according to an embodiment of the present disclosure.
Figure 9B:
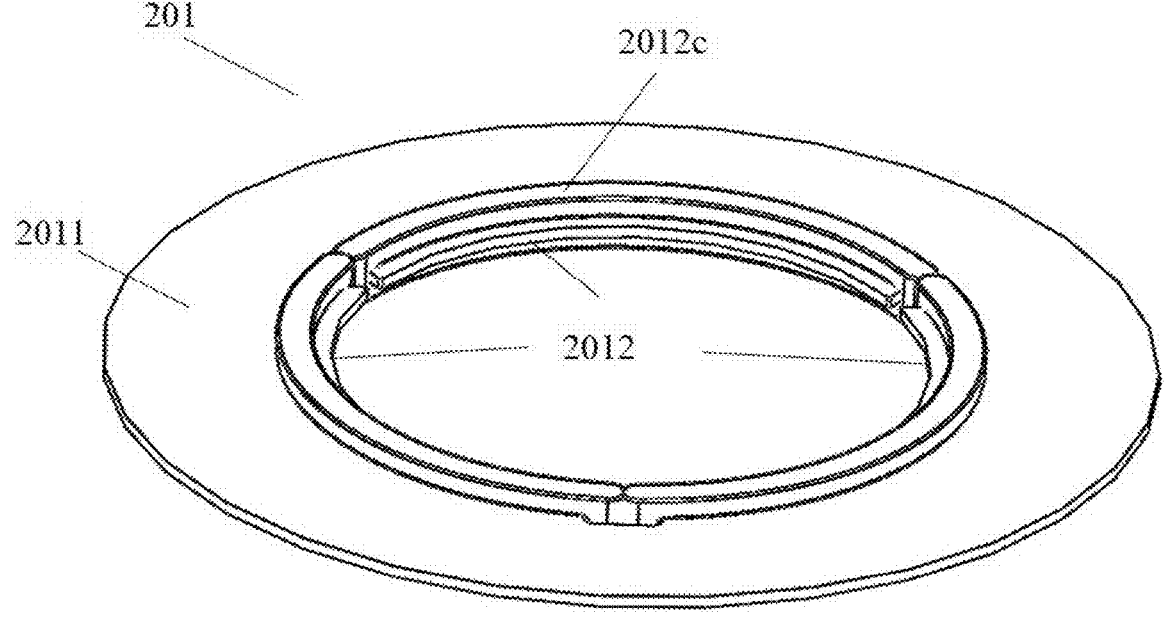
FIG. 9B is a schematic perspective diagram of a magnetic stator substrate of a magnetic levitation device according to an embodiment of the present disclosure.
Figure 9C:
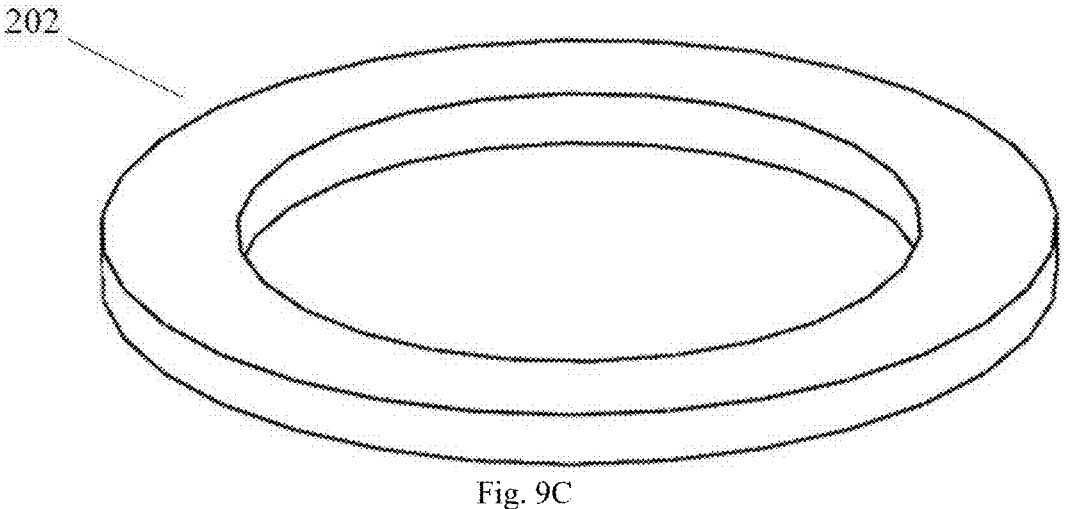
FIG. 9C is a schematic perspective diagram of a permanent magnet 202 of a magnetic levitation device according to an embodiment of the present disclosure.
Figure 9D:
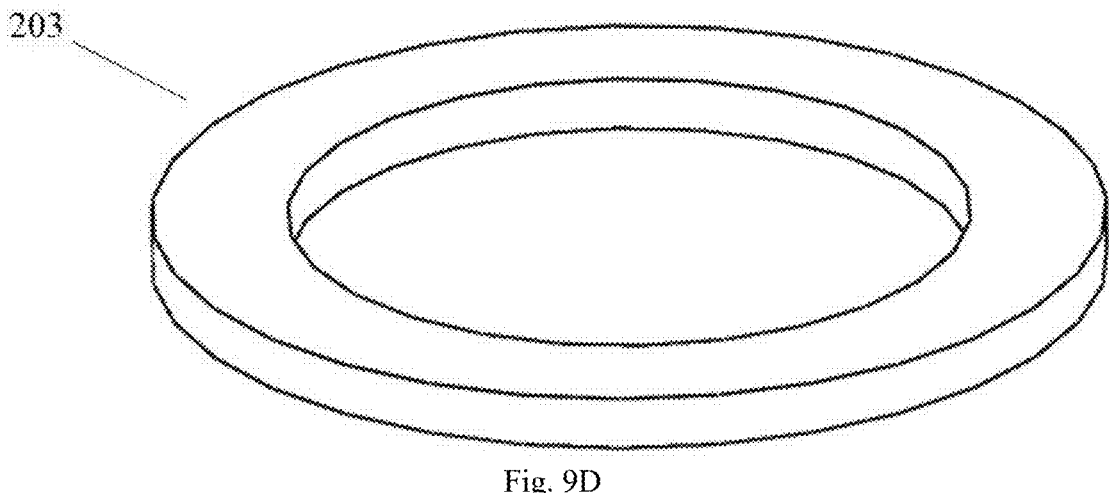
FIG. 9D is a schematic perspective diagram of a guiding magnet 203 of a magnetic levitation device according to an embodiment of the present disclosure.

FIG. 1 is a schematic perspective diagram of a magnetic levitation device according to an embodiment of the present disclosure, FIG. 2 is an exploded view of the magnetic levitation device illustrated in FIG. 1, and FIG. 3 is a schematic diagram illustrating an interaction force between a protrusion of a magnetic stator substrate and a flange of a rotor in the magnetic levitation device illustrated in FIG. 1; FIG. 4 is a schematic diagram illustrating magnetic force lines of the magnetic levitation device illustrated in FIG. 1. FIG. 9A is a schematic perspective diagram of a rotor of a magnetic levitation device according to an embodiment of the present disclosure; FIG. 9B is a schematic perspective diagram of a magnetic stator substrate of a magnetic levitation device according to an embodiment of the present disclosure; FIG. 9C is a schematic perspective diagram of a permanent magnet of a magnetic levitation device according to an embodiment of the present disclosure; and FIG. 9D is a schematic perspective diagram of a guiding magnet of a magnetic levitation device according to an embodiment of the present disclosure. Referring to FIGS. 1 to 4 and FIGS.

9A to 9D, the magnetic levitation device according to an embodiment of the present disclosure includes a rotor 10 and a stator 20 which is disposed to surround the rotor 10. The stator 20 includes at least three magnetic stator substrates 201, a permanent magnet 202 and a guiding magnet 203; the at least three magnetic stator substrates 201 are spaced apart from each other in an axial direction Z of the stator 20 to define at least two gaps 201' in the axial direction Z of the stator 20; the permanent magnet 202 and the guiding magnet 203 are alternately arranged in the at least two gaps 201' in the axial direction Z of the stator 20. Each of the at least three magnetic stator substrates 201 includes a substrate body 2011 and a protrusion 2012 connected with the substrate body 2011; the protrusion 2012 protrudes from the permanent magnet 202 and the guiding magnet 203 towards the rotor 10, and the protrusion 2012 is wound with a magnetic levitation coil 2012c. The at least three magnetic stator substrates 201 include a first magnetic stator substrate 201a; the protrusion 2012 and the magnetic levitation coil 2012c of the first magnetic stator substrate 201a apply an upward force along the axial direction Z of the stator 20 on the rotor 10; and a ratio of the number of the first magnetic stator substrate(s) 201a to the total number of the at least three magnetic stator substrates 201 is greater than or equal to 50%.

It should be noted that in the embodiments of the present disclosure, "an upward force along the axial direction Z of the stator 20" refers to a force along a direction opposite to the gravity direction of the rotor 10, and "a downward force along the axial direction Z of the stator 20" refers to a force along a direction as same as the gravity direction of the rotor 10.

According to the embodiment of the present disclosure, the protrusion 2012 and the magnetic levitation coil 2012c of the first magnetic stator substrate 201a apply an upward force along the axial direction Z of the stator 20 on the rotor 10, and the ratio of the number of the first magnetic stator substrate(s) 201a to the total number of the at least three magnetic stator substrates 201 is greater than or equal to 50%. That is to say, in the magnetic levitation device according to the embodiment of the present disclosure, half or more than half of the at least three magnetic stator substrates 201 apply an upward force along the axial direction Z of the stator 20 on the rotor 10, so that the magnetic levitation device can provide an axial support force which is great enough to balance the gravity of the rotor 10 and the gravity of the article supported or lifted by the rotor 10; in this way, even if the rotor 10 itself has a considerable weight and/or the rotor 10 supports or lifts an article with a considerable weight, the rotor 10 will not become unstable due to its own gravity and the gravity of the article it supports or lifts, and the rotor 10 can still be rotated and levitated stably. Therefore, the magnetic levitation device according to the embodiment of the present disclosure can be greatly expanded in terms of its application range, for example, it can include the rotor 10 with a considerable weight, or the rotor can support or lifts an article with considerable weight. It can be clearly seen from the interaction force between the stator 20 and the rotor 10 in FIG. 3 and from the distribution of magnetic force lines in FIG. 4 that the first magnetic stator substrate 201a applies an upward force along the axial direction Z of the stator 20 on the rotor 10 and that the ratio of the number of the first magnetic stator substrate(s) 201a to the total number of the at least three magnetic stator substrates 201 is greater than or equal to 50%. For example, FIG. 4 is a cross-sectional view of the rotor 10, the magnetic stator substrate 201, the permanent magnet 202, and the guiding magnet 203 taken along line A-A in FIG. 1.

For example, in the case that the rotor 10 supports an article, the article is placed on an upper surface of the rotor 10; under such circumstance, the article is in direct contact with the upper surface of the rotor 10, or the article is in direct contact with a support structure provided on the upper surface of the rotor 10 without being in direct contact with the upper surface of the rotor 10. For example, in the case that the rotor 10 lifts an article, the article is connected with a lower surface of the rotor 10; under such circumstance, the article is directly connected with the lower surface of the rotor 10, or the article is directly connected with a connecting structure which is connected with the lower surface of the rotor 10 without being directly connected with the lower surface of the rotor 10.

It should be noted that the protrusion 2012 and the magnetic levitation coil 2012c of the first magnetic stator substrate 201a apply an upward force along the axial direction Z of the stator 20 on the rotor 10, and the ratio of the number of the first magnetic stator substrate(s) 201a to the total number of the at least three magnetic stator substrates 201 is greater than or equal to 50%, which allows for a normal operation of the magnetic levitation device where the rotor 10 is rotated and levitated stably under the action of the stator 20.

For example, according to the embodiment of the present disclosure, in order to enable the magnetic levitation device to provide an axial support force large enough to balance the gravity of the rotor 10 and the gravity of the article supported or lifted by the rotor 10, the ratio of the number of the first magnetic stator substrate(s) 201a to the total number of the at least three magnetic stator substrates 201 is greater than or equal to 60%; further, the ratio is greater than or equal to 70%; still further, the ratio is greater than or equal to 80%; yet still further, the ratio is greater than or equal to 90%, and even equal to 100% (i.e., the at least three magnetic stator substrates 201 are all first magnetic stator substrates 201a). Referring to FIGS. 3 and 4, two of the three magnetic stator substrates 201 are first magnetic stator substrates 201a, so that the ratio of the number of the first magnetic stator substrates 201a to the total number of the three magnetic stator substrates 201 is more than 50%.

For example, the current flows through the magnetic levitation coil 2012c; the rotor 10 is levitated under the action of the protrusion 2011 and the magnetic levitation coil 2012c of the magnetic stator substrate 201. For example, the magnitude of the current in the magnetic levitation coil 2012c can be adjusted, so that the force applied by the stator 20 on the rotor can be adjusted. For example, the magnitude of the current in the magnetic levitation coil 2012c wound on the protrusion 2012 of the first magnetic stator substrate 201a can be adjusted, so that the magnitude of the upward force applied on the rotor 10 along the axial direction Z of the stator 20 by the protrusion 2012 and the magnetic levitation coil 2012c of the first magnetic stator substrate 201a can be adjusted. In this way, in the case that the magnetic levitation device according to the embodiment of the present disclosure supports or lifts an article, different upward forces can be applied to the rotor 10 along the axial direction Z of the stator 20 depending on the article which is supported or lifted, thus improving the working flexibility of the magnetic levitation device according to the embodiment of the present disclosure. That is to say, the magnetic levitation device according to the embodiment of the present disclosure can provide an axial support force which is large and adjustable.

It should be noted that the position(s) of the first magnetic stator substrate(s) 201a distributed among the at least three magnetic stator substrates 201 will not be limited in the embodiment of the present disclosure, as long as the protrusion 2012 and the magnetic levitation coil 2012c of the first magnetic stator substrate 201a apply an upward force along the axial direction Z of the stator 20 on the rotor 10 and the ratio of the number of the first magnetic stator substrate(s) 201a to the total number of the at least three magnetic stator substrates 201 is greater than or equal to 50%. For example, in FIG. 3, although the two magnetic stator substrates 201 at the upper side are illustrated as first magnetic stator substrates 201a, it's also possible that the two magnetic stator substrates at the lower side are the first magnetic stator substrates 201a.

It should be noted that, by way of example, FIGS. 1 to 4 illustrate the case where the stator 20 surrounds the rotor 10; however, the embodiment of the present disclosure is not limited to this, and the rotor 10 may surround the stator 20.

For example, according to the embodiment of the present disclosure, the rotor 10 and the stator 20 are spaced apart from each other; further, for example, in the normal working state of the magnetic levitation device, the rotor 10 and the stator 20 are spaced apart from each other so that the rotor 10 and the stator 20 are not in contact with each other, thereby avoiding a series of problems such as heat generation and contamination caused by mechanical friction. For example, in the case that the stator 20 and the rotor 10 are spaced apart from each other, other structure(s) may be provided in the gap between the stator 20 and the rotor 10 as required, or the stator 20 and the rotor 10 may be spaced apart from each other only by an air gap without providing any other structures therebetween.

For example, according to an embodiment of the present disclosure, at least three magnetic stator substrates 201 are spaced apart from each other in the axial direction Z of the stator 20 to define at least two gaps 201' in the axial direction Z of the stator 20. In this case, for example, if the number of the magnetic stator substrates 201 is N and N≥3, the number of the gaps 201' defined by the magnetic stator substrates 201 is N−1.

For example, according to the embodiment of the present disclosure, the permanent magnet 202 and the guiding magnet 203 are alternately arranged in at least two gaps 201' in the axial direction Z of the stator 20; that is, for two adjacent gaps 201', one gap 201' is provided with a permanent magnet 202 therein and the other gap 201' is provided with the guiding magnet 203 therein. Referring to FIG. 4, by alternately arranging the permanent magnet 202 and the guiding magnet 203 in at least two gaps 201' in the axial direction Z of the stator 20, a closed magnetic circuit acting on the rotor 10 can be formed in any two adjacent magnetic stator substrates 201, so that each of the at least three magnetic stator substrates 201 can apply an acting force on the rotor 10, which ensures the controllability of the number of the first magnetic stator substrate(s) 201a and the controllability of the ratio of the number of the first magnetic stator substrate(s) 201a to the total number of the at least three magnetic stator substrates 201. It should be noted that, according to the embodiment of the present disclosure, one gap 201' is provided with either the permanent magnet 202 or the guiding magnet 203, so that any two adjacent magnetic stator substrates 201 among the at least three magnetic stator substrates 201 are not in direct contact with each other.

For example, according to an embodiment of the present disclosure, the rotor 1 is made from a magnetic material, and examples of the magnetic material include but are not limited to a permanent magnetic material or a ferromagnetic material. Further, for example, the ferromagnetic material is a soft magnetic material with a magnetic conductivity much greater than the magnetic conductivity of the vacuum, and examples thereof include but are not limited to iron, cobalt, nickel and their alloys, carbon steel, silicon steel, and electrotechnical pure iron. Examples of permanent magnetic materials include, but are not limited to, samarium cobalt, NdFeB and ferrite. For example, referring to FIG. 9A, a support structure 102 is provided on the upper surface of the rotor 10, and the article to be supported by the rotor 10 can be placed on the support structure 102. For example, the rotor 10 is used for supporting a semiconductor wafer to be processed, which is placed on the support structure 102.

For example, according to an embodiment of the present disclosure, at least three magnetic stator substrates 201 are made from a magnetic material; further, for example, the magnetic material is a ferromagnetic material; further, for example, the ferromagnetic material is a soft magnetic material with a magnetic conductivity much greater than the magnetic conductivity of the vacuum, and examples thereof include but are not limited to iron, cobalt, nickel and their alloys, carbon steel, silicon steel, and electrotechnical pure iron. For example, the materials of the at least three magnetic stator substrates 201 may be the same or different from each other. In the case that the at least three magnetic stator substrates 201 are of the same material, it can simplify the processing technology of the magnetic levitation device. For example, referring to FIG. 9B, the substrate body 2011 of each of the at least three magnetic stator substrates 201 is has a ring shape. For example, referring to FIG. 9B, each of the at least three magnetic stator substrates 201 includes a plurality of protrusions 2012, each of the protrusions 2012 is connected with the substrate body 2011, and each of the protrusions 2012 is wound with a magnetic levitation coil 2012c. For example, referring to FIG. 9B, the plurality of protrusions 2012 are arranged along an inner circumferential direction of the substrate body 2011 and are spaced apart from each other at equal intervals. For example, referring to FIG. 9B, the plurality of protrusions 2012 have the same size in the inner circumferential direction of the substrate body 2011. For example, the plurality of protrusions 2012 included in the same magnetic stator substrate 201 are arranged at the same height in the axial direction Z of the stator 20; more specifically, upper surfaces of the plurality of protrusions 2012 included in the same magnetic stator substrate 201 are located in the same plane in the axial direction Z of the stator 20, and lower surfaces of the plurality of protrusions 2012 included in the same magnetic stator substrate 201 are located in the same plane in the axial direction Z of the stator 20. For example, if the permanent magnet 202 or the guiding magnet 203 is not provided between any two of the plurality of protrusions 2012 in the axial direction Z of the stator 20, the plurality of protrusions 2012 belong to the same magnetic stator substrate 201. It should be noted that, FIG. 9B illustrates an example where the same magnetic stator substrate 201 includes three protrusions 2012; however, the embodiment of the present disclosure is not limited to this, and the same magnetic stator substrate 201 may include any number of protrusions 2012, which can be flexibly designed according to the situation. It should be noted that the numbers of the protrusions 2012 included in the respective at least three magnetic stator substrates 201 may be the same or different, which is not limited in the embodiment of the present disclosure. For example, the at least three magnetic stator substrates 201 respectively include the same numbers of protrusions 2012, so as to simplify the processing technology of the magnetic levitation device.

For example, according to an embodiment of the present disclosure, the permanent magnet 202 is made from a permanent magnetic material, and examples of the permanent magnetic material include, but are not limited to, samarium cobalt, NdFeB and ferrite. For example, referring to FIG. 9C, the permanent magnet 202 has a ring shape. For example, the size of the substrate body 2011 of each of the at least three magnetic stator substrates 201 is as same as the size of the permanent magnet 202 in the radial direction, so that the substrate body 2011 and the permanent magnet 202 are completely coincident in the axial direction Z of the stator 20.

For example, according to an embodiment of the present disclosure, the guiding magnet 203 is made from a magnetic material; further, for example, the magnetic material is a ferromagnetic material; further, for example, the ferromagnetic material is a soft magnetic material with a magnetic conductivity much greater than the magnetic conductivity of the vacuum, and examples thereof include but are not limited to iron, cobalt, nickel and their alloys, carbon steel, silicon steel, and electrotechnical pure iron. For example, referring to FIG. 9D, the guiding magnet 203 has a ring shape. For example, the size of the substrate body 2011 of each of the at least three magnetic stator substrates 201 is as same as the size of the guiding magnet 203 in the radial direction, so that the substrate body 2011 and the guiding magnet 203 are completely coincident in the axial direction Z of the stator 20. For example, the substrate body 2011, the permanent magnet 202 and the guiding magnet 203 are completely coincident in the axial direction Z of the stator 20.

In FIGS. 1 to 4, as an example, the magnetic levitation device includes three magnetic stator substrates 201 which define two gaps 201', the permanent magnet 202 is arranged in one of the two gaps 201', the guiding magnet 203 is arranged in the other one of the two gaps 201', and two of the three magnetic stator substrates 201 are the first magnetic stator substrates 201a. However, the embodiment of the present disclosure is not limited to this, and the number of the magnetic stator substrates 201 may be four, five, six or more; accordingly, the number of the gaps 201' also varies with the number of the magnetic stator substrates 201, and permanent magnets 202 and guiding magnets 203 are alternately arranged. It should be noted that, the N pole of the permanent magnet 202 is located at the upper side and the S pole thereof is located at the lower side as illustrated in FIG. 4, but the embodiment of the present disclosure is not limited to this, and the N pole of the permanent magnet 202 may be located at the lower side and the S pole thereof is located at the upper side.

Figure 5:
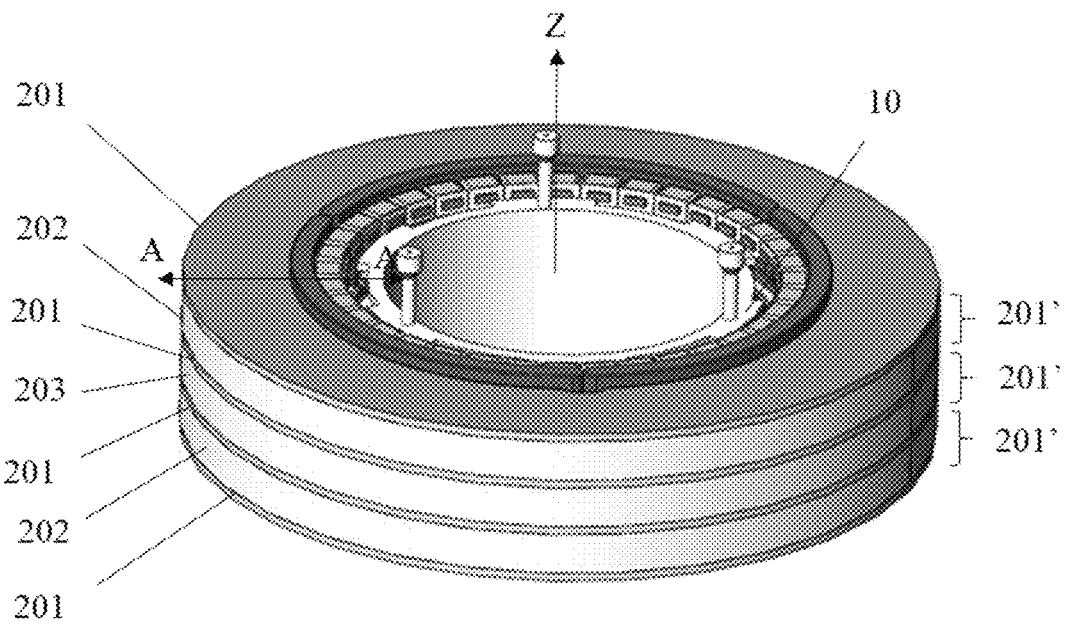
FIG. 5 is another schematic perspective diagram of a magnetic levitation device according to an embodiment of the present disclosure.
Figure 6:
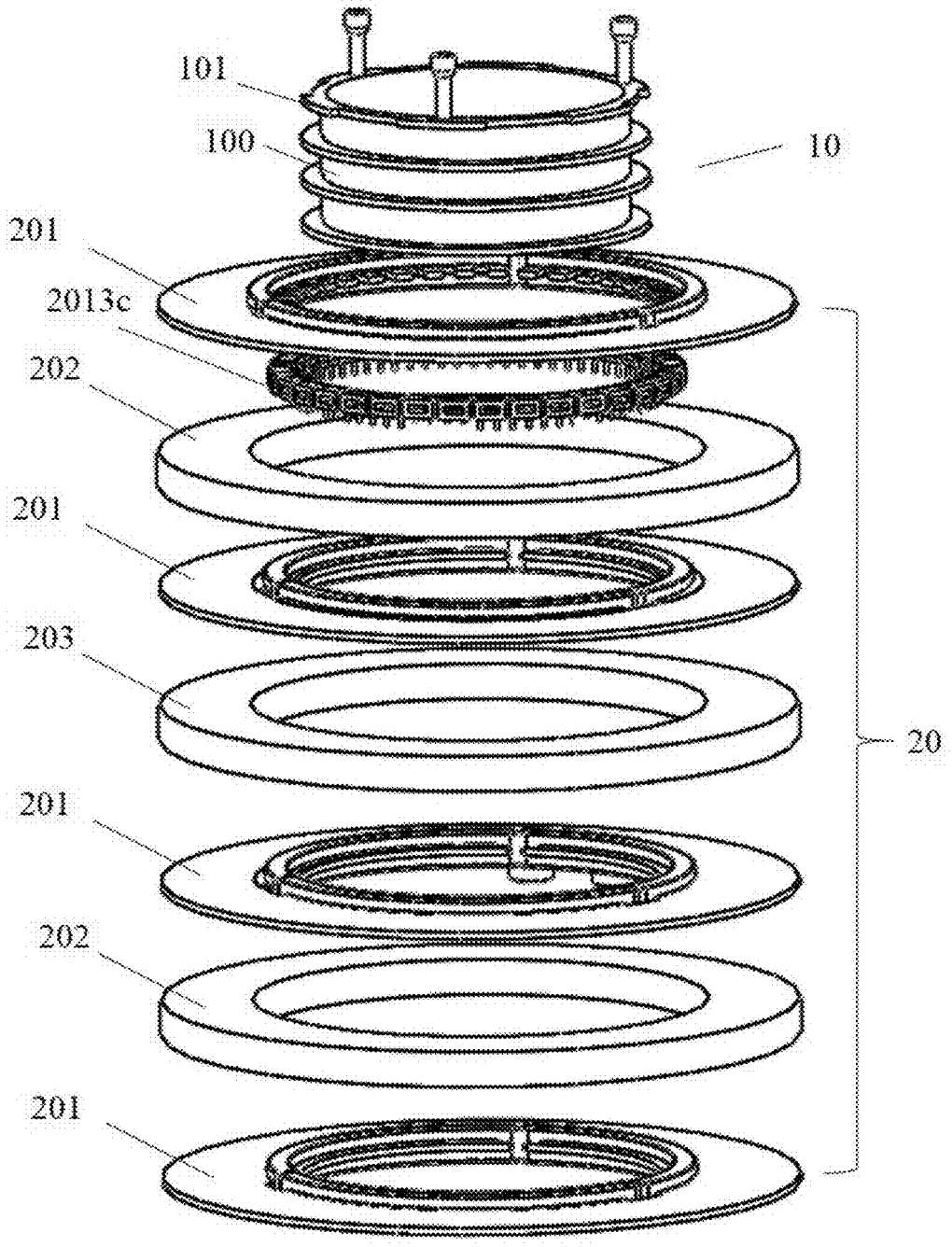
FIG. 6 is an exploded view of the magnetic levitation device illustrated in FIG. 5.
Figure 7:
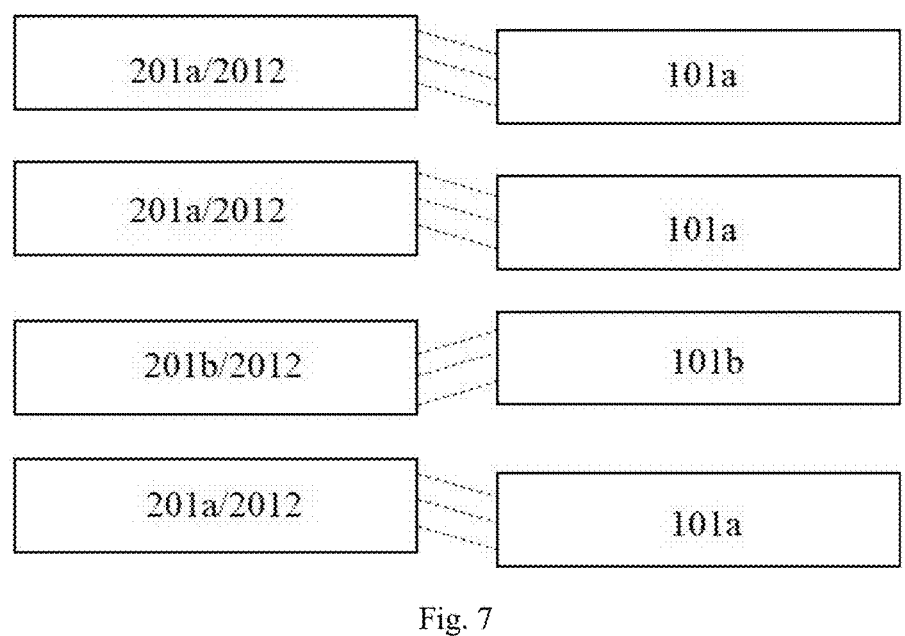
FIG. 7 is a schematic diagram illustrating an interaction force between a protrusion 2012 of a magnetic stator substrate and a flange of a rotor in the magnetic levitation device illustrated in FIG. 5.
Figure 8:
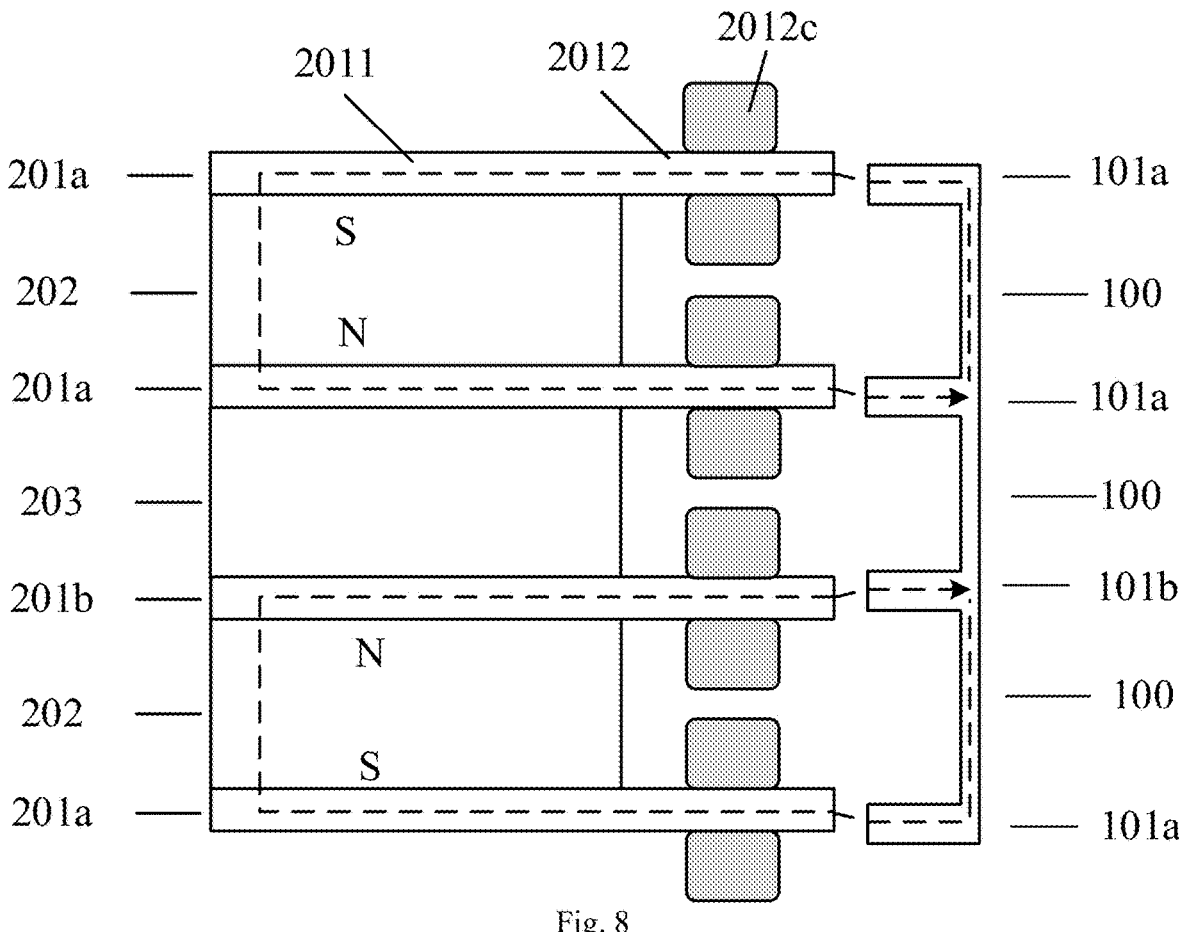
FIG. 8 is a schematic diagram illustrating magnetic force lines of the magnetic levitation device illustrated in FIG. 5.

FIG. 5 is another schematic perspective diagram of a magnetic levitation device according to an embodiment of the present disclosure; FIG. 6 is an exploded view of the magnetic levitation device illustrated in FIG. 5; FIG. 7 is a schematic diagram illustrating an interaction force between a protrusion 2012 of a magnetic stator substrate and a flange of a rotor in the magnetic levitation device illustrated in FIG. 5; and FIG. 8 is a schematic diagram illustrating magnetic force lines of the magnetic levitation device illustrated in FIG. 5. For example, FIG. 8 is a cross-sectional view of the rotor 10, the magnetic stator substrate 201, the permanent magnet 202, and the guiding magnet 203 taken along the line A-A of FIG. 5. Referring to FIGS. 5 to 8, the magnetic levitation device includes four magnetic stator substrates 201 that define three gaps 201', in which the permanent magnets 202 and the guiding magnet 203 are alternately arranged, and three of the four magnetic stator substrates 201 are the first magnetic stator substrates 201*a*.

It should be noted that, referring to FIGS. 5 to 8, three of the four magnetic stator substrates 201 are the first magnetic stator substrates 201*a*. However, the embodiment of the present disclosure is not limited to this; the four magnetic stator substrates 201 may all be the first magnetic stator substrates 201*a*, or, two of the four magnetic stator substrates 201 may be the first magnetic stator substrates 201*a*; both of these two cases satisfy that the ratio of the number of the first magnetic stator substrates 201*a* to the total number of the at least three magnetic stator substrates 201 is greater than or equal to 50%.

It should be noted that, referring to FIGS. 5 to 8, the uppermost two magnetic stator substrates 201 and the lowermost one magnetic stator substrate 201 are the first magnetic stator substrate 201*a*; however, the embodiment of the present disclosure is not limited to this, it's also possible that any three or any two of four magnetic stator substrates 201 are the first magnetic stator substrates 201*a*.

For example, referring to FIGS. 1 to 8, in the magnetic levitation device according to the embodiment of the present disclosure, along the axial direction Z of the stator 20, the permanent magnet 202 is arranged in the odd-numbered gap(s) 201' counting from top to bottom among the at least two gaps 201', and the guiding magnet 203 is arranged in the even-numbered gap(s) 201' counting from top to bottom among the at least two gaps 201'. In this way, the number of the permanent magnets 202 is greater than or equal to the number of the guiding magnets 203, and the acting force applied on the rotor 10 by the stator 20 can be enhanced.

Figure 18:
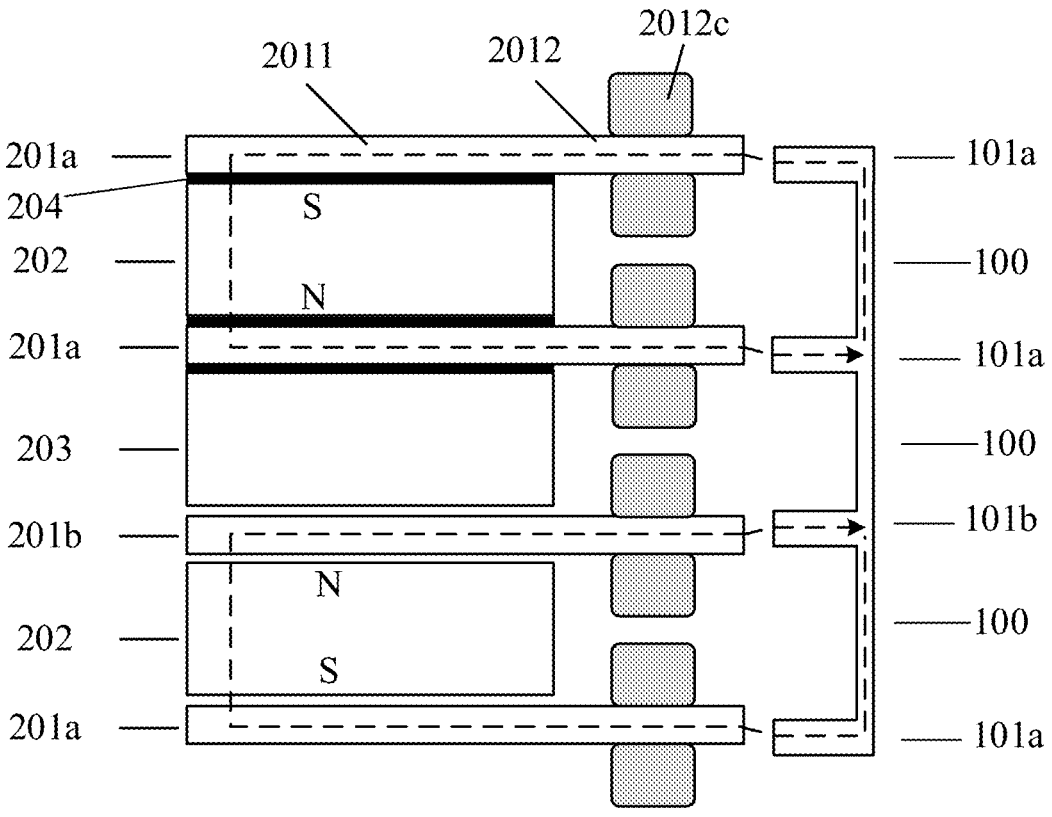
FIG. 18 is another schematic diagram of magnetic force lines of the magnetic levitation device illustrated in FIG. 5.

For example, referring to FIGS. 1 to 8, in the magnetic levitation device according to the embodiment of the present disclosure, the permanent magnet 202 is in direct contact with the magnetic stator substrate 201 adjacent thereto. However, the embodiment of the present disclosure is not limited thereto. FIG. 18 is another schematic diagram illustrating the magnetic force lines of the magnetic levitation device illustrated in FIG. 5. Referring to FIG. 18, the permanent magnet 202 and the magnetic stator substrate 201 adjacent thereto are spaced apart by an air gap, or, a guiding magnet piece 204 is inserted between the permanent magnet 202 and the magnetic stator substrate 201 adjacent thereto. In these two cases, the size of the permanent magnet 202 may not be matched with the size of the gap 201' perfectly, thus greatly reducing the requirements for machining accuracy of the magnetic levitation device according to the embodiment of the present disclosure. In the case where the permanent magnet 202 and the magnetic stator substrate 201 adjacent thereto are not in direct contact but have an air gap therebetween, the guiding magnet piece 204 may be inserted in the air gap; alternatively, the guiding magnet piece 204 may not be inserted in the air gap without causing any influence to the close of the magnetic field, which can be flexibly arranged according to actual situations.

For example, referring to FIGS. 1 to 8, in the magnetic levitation device according to the embodiment of the present disclosure, the guiding magnet 203 is in direct contact with the magnetic stator substrate 201 adjacent thereto. However, the embodiment of the present disclosure is not limited thereto. Referring to FIG. 18, the guiding magnet 203 and the magnetic stator substrate 201 adjacent thereto are spaced apart by an air gap, or, a guiding magnet piece 204 is inserted between the guiding magnet 203 and the magnetic stator substrate 201 adjacent thereto. In these two cases, the size of the guiding magnet 203 may not be matched with the size of the gap 201' perfectly, thus greatly reducing the requirements for machining accuracy of the magnetic levitation device according to the embodiment of the present disclosure. In the case where the guiding magnet 203 and the magnetic stator substrate 201 adjacent thereto are not in direct contact but have an air gap therebetween, a guiding magnet piece 204 may be inserted in the air gap, or the guiding magnet piece 204 may not be inserted in the air gap without causing any influence to the close of the magnetic field, which can be flexibly arranged according to actual situations.

For example, referring to FIGS. 1 to 8, in the magnetic levitation device according to the embodiment of the present disclosure, at least three magnetic stator substrates 201 are arranged at equal intervals in the axial direction Z of the stator 20; in this way, the processing technology of the magnetic levitation device according to the embodiment of the present disclosure and also the control operation of the magnetic levitation device according to the embodiment of the present disclosure can be simplified. However, the embodiment of the present disclosure is not limited to this, and the at least three magnetic stator substrates 201 may be arranged at unequal intervals in the axial direction Z of the stator 20.

For example, referring to FIGS. 1 to 8, in the magnetic levitation device according to the embodiment of the present disclosure, the thickness of the permanent magnet 202 is equal to the thickness of the guiding magnet 203 in the axial direction Z of the stator 20; in this way, the processing technology of the magnetic levitation device according to the embodiment of the present disclosure and also the control operation of the magnetic levitation device according to the embodiment of the present disclosure can be simplified. However, the embodiment of the present disclosure is not limited to this, and the thickness of the permanent magnet 202 may not be equal to the thickness of the guiding magnet 203 in the axial direction Z of the stator 20.

For example, referring to FIGS. 1 to 8, in the magnetic levitation device according to the embodiment of the present disclosure, the at least three magnetic stator substrates 201 have the same thickness in the axial direction Z of the stator 20; in this way, the processing technology of the magnetic levitation device according to the embodiment of the present disclosure and also the control operation of the magnetic levitation device according to the embodiment of the present disclosure can be simplified. However, the embodiment of the present disclosure is not limited to this, and the thicknesses of the at least three magnetic stator substrates 201 in the axial direction Z of the stator 20 may also be different from each other.

For example, referring to FIGS. 1 to 8, in the magnetic levitation device according to the embodiment of the present disclosure, the at least three magnetic stator substrates 201 further include a second magnetic stator substrate 201*b*, and a protrusion 2012 of the second magnetic stator substrate 201*b* and a magnetic levitation coil 2012*c* wound on the protrusion 2012 apply a downward force along the axial direction Z of the stator 20 on the rotor 10, and the number of the first magnetic stator substrate(s) 201*a* is greater than or equal to the number of the second magnetic stator substrate(s) 201*b*. By arranging the second magnetic stator substrate 201*b* and enabling the protrusion 2012 of the second magnetic stator substrate 201*b* and the magnetic levitation coil 2012*c* wound on the protrusion 2012 to apply a downward force along the axial direction Z of the stator 20 on the rotor 10, the position of the rotor 10 in the axial direction Z of the stator 20 can be adjusted under the action of a resultant force of the upward force and the downward force, and the flexibility of the magnetic levitation device according to the embodiment of the present disclosure is enhanced. By enabling the number of the first magnetic stator substrate(s) 201*a* to be greater than or equal to the number of the second magnetic stator substrate(s) 201*b*, it ensures that the ratio of the number of the first magnetic stator substrate(s) 201*a* to the total number of the at least three magnetic stator substrates 201 is greater than 50%, so as to ensure that the magnetic levitation device provides an axial support force large enough to balance the gravity of the rotor 10 and the gravity of the article supported or lifted by the rotor 10. In this way, even if the rotor 10 itself has a considerable weight and/or the rotor 10 supports or lifts an article with a considerable weight, the rotor 10 will not become unstable due to its own gravity and the gravity of the article it supports or lifts, and the rotor 10 can still be rotated and levitated stably.

For example, the magnitude of the current in the magnetic levitation coil 2012*c* wound on the protrusion 2012 of the second magnetic stator substrate 201*b* can be adjusted, so that the magnitude of the downward force applied on the rotor 10 along the axial direction Z of the stator 20 by the protrusion 2012 and the magnetic levitation coil 2012*c* of the second magnetic stator substrate 201*b* can be adjusted. In this way, the position of the rotor in the axial direction Z of the stator 20 can be adjusted in real time according to actual situations, and the working flexibility of the magnetic suspension device according to the embodiment of the present disclosure is improved.

For example, according to the embodiment of the present disclosure, the number of the first magnetic stator substrate (s) 201*a* is at least two, and the number of the second magnetic stator substrate(s) 201*b* is at least one, so as to ensure that the number of the first magnetic stator substrate (s) 201*a* is greater than that of the second magnetic stator substrate(s) 201*b*. Accordingly, the magnetic levitation device can provide an axial support force large enough to balance the gravity of the rotor 10 and the gravity of the article supported or lifted by the rotor 10 while ensuring the adjustability of the position of the rotor 10 in the axial direction Z of the stator 20.

For example, according to the embodiment of the present disclosure, the number of the second magnetic stator substrate(s) 201*b* is one. In this case, except the one magnetic stator substrate which is used as the second magnetic stator substrate 201*b*, all the other magnetic stator substrates are used as the first magnetic stator substrates 201*a*, so that the magnetic levitation device can provide an axial support force more sufficient to balance the gravity of the rotor 10 with greater weight and the gravity of the article with greater weight which is supported or lifted by the rotor 10.

It should be noted that, according to the embodiment of the present disclosure, the at least three magnetic stator substrates 201 further include a magnetic stator substrate that is neither used as the first magnetic stator substrate 201*a* nor the second magnetic stator substrate 201*b*; that is, such a magnetic stator substrate applies neither an upward force in the axial direction Z of the stator 20 nor a downward force in the axial direction Z of the stator 20 on the rotor 10. For example, such a magnetic stator substrate is provided with a magnetic rotating coil.

For example, referring to FIGS. 5 to 8, according to the embodiment of the present disclosure, the number of the at least three magnetic stator substrates 201 is four or more than four; and in the axial direction Z of the stator 20, opposite surfaces of two adjacent permanent magnets 202 have the same magnetism. In this way, a closed magnetic circuit acting on the rotor 10 can be formed in any two adjacent magnetic stator substrates 201, so that each of the at least three magnetic stator substrates 201 can apply an acting force on the rotor 10, thereby ensuring the controllability of the number of the first magnetic stator substrate(s) 201*a* and ensuring the controllability of the ratio of the number of the first magnetic stator substrate(s) 201*a* to the total number of the at least three magnetic stator substrates 201. As an example, it is illustrated in FIG. 5 that the opposite surfaces of two adjacent permanent magnets 202 have the same magnetism and are both N poles. However, the embodiment of the present disclosure is not limited to this, and it's also possible that the opposite surfaces of the two adjacent permanent magnets 202 have the same magnetism and are both S poles. It should be noted that, "two adjacent permanent magnets 202" means that there is no other permanent magnet 202 between the two permanent magnets 202, but a component other than the permanent magnet 202, such as a magnetic stator substrate 201 and a guiding magnet 203, can be arranged between the two permanent magnets 202.

For example, referring to FIGS. 5 to 8, according to an embodiment of the present disclosure, the stator 20 includes at least two permanent magnets 202, and the magnetic fields of the at least two permanent magnets 202 have the same magnetic-field intensity. In this way, the processing technology of the magnetic levitation device according to the embodiment of the present disclosure and also the control operation of the magnetic levitation device according to the embodiment of the present disclosure can be simplified.

For example, referring to FIGS. 1 to 8 and 9A, according to an embodiment of the present disclosure, the rotor 10 includes a rotor body 100 and at least three flanges 101 protruding from the rotor body 100 towards the stator 20; the at least three magnetic stator substrates 201 and the at least three flanges 101 are same in their amounts and are provided in one-to-one correspondence; the at least three flanges 101 include a first flange 101*a* corresponding to the first magnetic stator substrate 201*a*, and a center line of the protrusion 2012 of the first magnetic stator substrate 201*a* in the axial direction Z of the stator 20 is higher than a center line of the first flange 101*a* in the axial direction Z of the stator 20. The center line of the protrusion 2012 of the first magnetic stator substrate 201*a* in the axial direction Z of the stator 20 is higher than the center line of the first flange 101*a* in the axial direction Z of the stator 20, which ensures that the protrusion 2012 and the magnetic levitation coil 2012*c* of the first magnetic stator substrate 201*a* apply an upward force along the axial direction Z of the stator 20 on the rotor 10. For example, a relative relationship between the center line of the protrusion 2012 of the first magnetic stator substrate 201*a* in the axial direction Z of the stator 20 and the center line of the first flange 101*a* in the axial direction Z of the stator 20 can be adjusted by adjusting the current in the magnetic levitation coil 2012*c* wound on the protrusion 2012 of the first magnetic stator substrate 201*a* and/or adjusting the current in the magnetic levitation coil 2012*c* wound on the protrusion 2012 of the second magnetic stator substrate 201*b*.

For example, in the magnetic levitation device according to the embodiment of the present disclosure, the thickness of each of the at least three magnetic stator substrates 201 in the axial direction Z of the stator 20 is equal to the thickness of each of the at least three flanges 101 in the axial direction Z of the stator 20. In this way, the processing technology of the magnetic levitation device according to the embodiment of the present disclosure and also the control operation of the magnetic levitation device according to the embodiment of the present disclosure can be simplified. However, the embodiment of the present disclosure is not limited to this, and the thickness of each of the at least three magnetic stator substrates 201 in the axial direction Z of the stator 20 may also be unequal to the thickness of each of the at least three flanges 101 in the axial direction Z of the stator 20.

FIGS. 10A-10B, 11A-11B, 12A-12B and 13A-13B respectively illustrate a positional relationship between the protrusion 2012 of the first magnetic stator substrate 101a and the first flange 101a of the rotor 10 in the magnetic levitation device according to the embodiments of the present disclosure. In these figures, the center line of the protrusion 2012 of the first magnetic stator substrate 201a in the axial direction Z of the stator 20 and the center line of the first flange 101a of the rotor 10 in the axial direction Z of the stator 20 are indicated by dotted lines.

For example, according to the embodiment of the present disclosure, the center line of the protrusion 2012 of the first magnetic stator substrate 201a in the axial direction Z of the stator 20 is higher than the center line of the first flange 101a of the rotor 10 in the axial direction Z of the stator 20, which includes one of the following situations. Situation (i), in the axial direction Z of the stator 20, an upper surface of the protrusion 2012 of the first magnetic stator substrate 201a is higher than an upper surface of the first flange 101a, and a lower surface of the protrusion 2012 of the first magnetic stator substrate 201a is higher than (see FIG. 10A) or is at the same height as (see FIG. 10B) the upper surface of the first flange 101a. Situation (ii), in the axial direction Z of the stator 20, the upper surface of the protrusion 2012 of the first magnetic stator substrate 201a is higher than (see FIG. 11A) or is at the same height as (see FIG. 11B) the upper surface of the first flange 101a, and a lower surface of the first flange 101a is lower than the lower surface of the protrusion 2012 of the first magnetic stator substrate 201a, and the upper surface of the first flange 101a is higher than the lower surface of the protrusion 2012 of the first magnetic stator substrate 201a. Situation (iii), in the axial direction Z of the stator 20, the upper surface of the protrusion 2012 of the first magnetic stator substrate 201a is higher than the upper surface of the first flange 101a, and the lower surface of the first flange 101a is higher than (see FIG. 12A) or is at the same height as (FIG. 12B) the lower surface of the protrusion 2012 of the first magnetic stator substrate 201a. Situation (iv), in the axial direction Z of the stator 20, the upper surface of the protrusion 2012 of the first magnetic stator substrate 201a is at the same height as (see FIG. 13A) or is lower than (see FIG. 13B) the upper surface of the first flange 101a, and the lower surface of the protrusion 2012 of the first magnetic stator substrate 201a is higher than the lower surface of the first flange 101a.

Figure 11A:
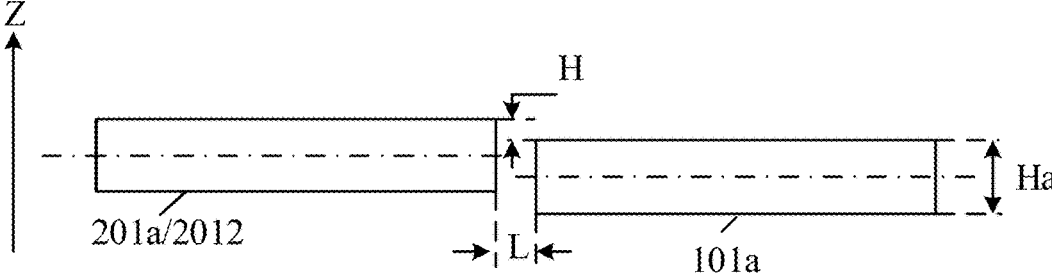
FIG. 11A is a schematic diagram illustrating a second example of a positional relationship between a protrusion 2012 of a first magnetic stator substrate 201a and a first flange of a rotor in a magnetic levitation device according to an embodiment of the present disclosure.
Figure 11B:
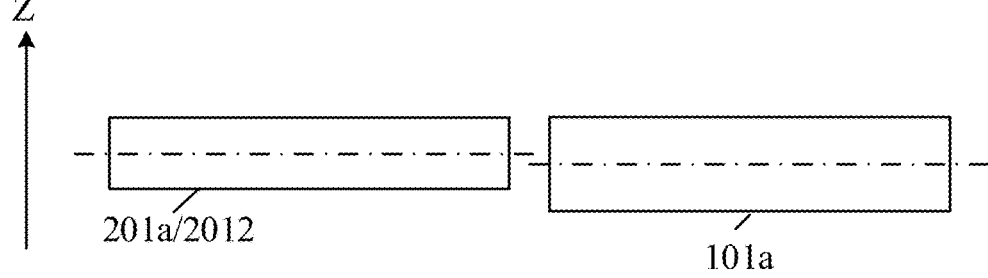
FIG. 11B is another schematic diagram illustrating the second example of the positional relationship between the protrusion 2012 of the first magnetic stator substrate 201a and the first flange of the rotor in the magnetic levitation device according to the embodiment of the present disclosure.
Figure 12A:
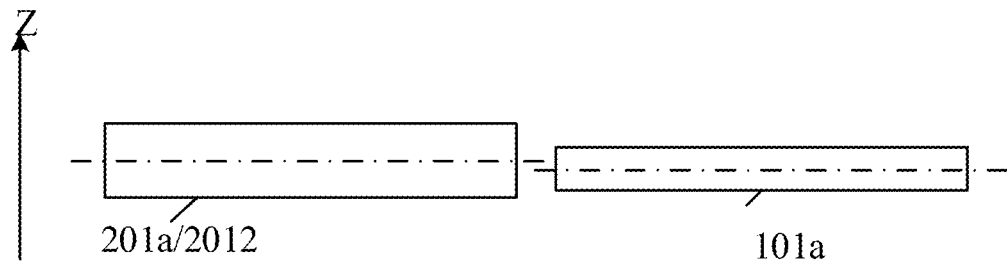
FIG. 12A is a schematic diagram illustrating a third example of a positional relationship between a protrusion 2012 of a first magnetic stator substrate 201a and a first flange of a rotor in a magnetic levitation device according to an embodiment of the present disclosure.
Figure 12B:
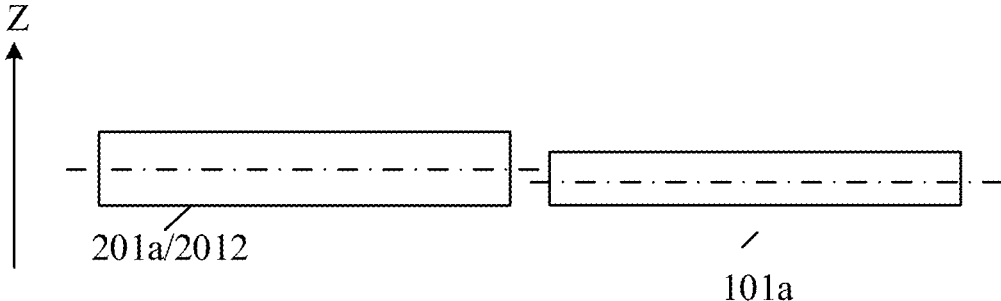
FIG. 12B is another schematic diagram illustrating the third example of the positional relationship between the protrusion 2012 of the first magnetic stator substrate 201a and the first flange of the rotor in the magnetic levitation device according to the embodiment of the present disclosure.
Figure 13A:
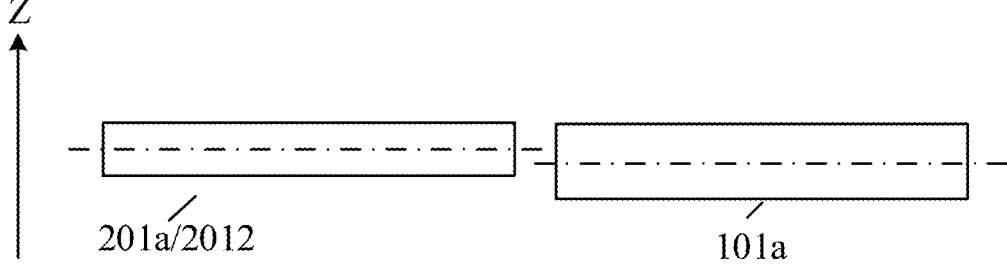
FIG. 13A is a schematic diagram illustrating a fourth example of a positional relationship between a protrusion 2012 of a first magnetic stator substrate 201a and a first flange of a rotor in a magnetic levitation device according to an embodiment of the present disclosure.
Figure 13B:
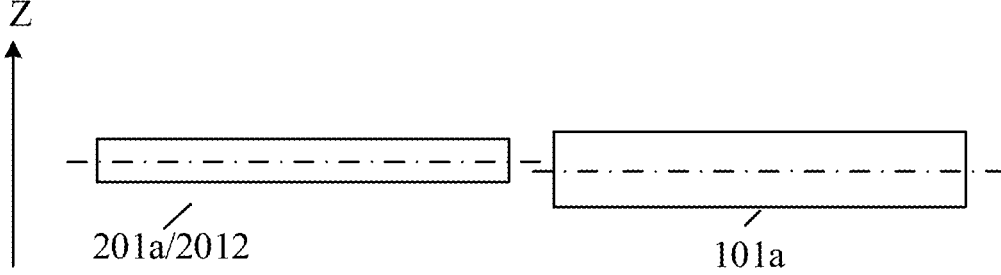
FIG. 13B is another schematic diagram illustrating the fourth example of the positional relationship between the protrusion 2012 of the first magnetic stator substrate 201a and the first flange of the rotor in the magnetic levitation device according to the embodiment of the present disclosure.
Figure 14A:
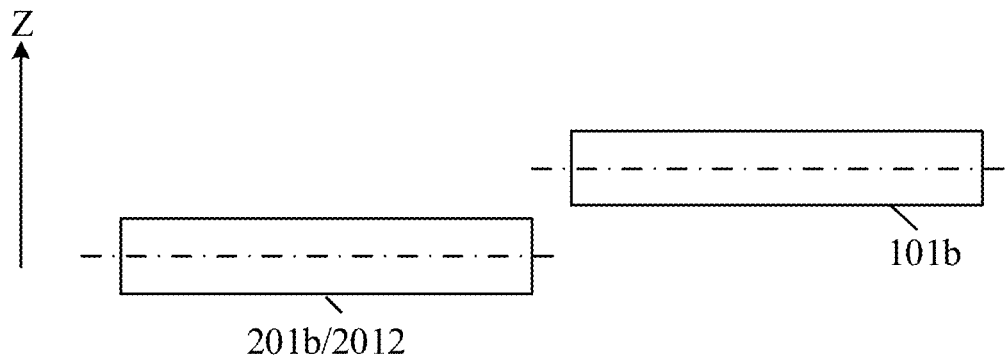
FIG. 14A is a schematic diagram illustrating a first example of a positional relationship between a second flange of a rotor and a protrusion 2012 of a second magnetic stator substrate in a magnetic levitation device according to an embodiment of the present disclosure.
Figure 14B:
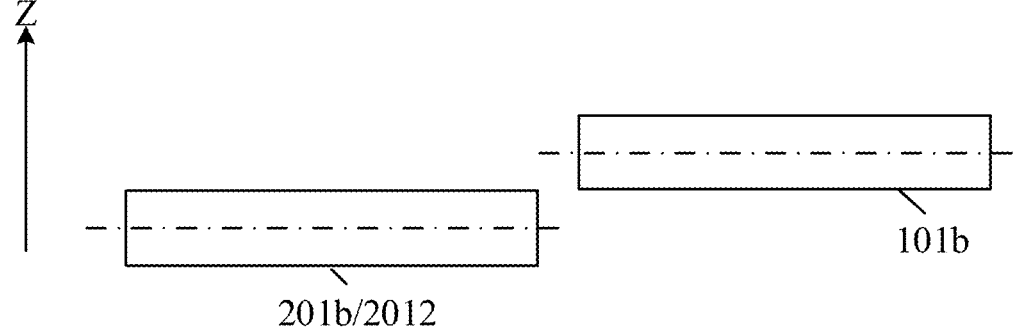
FIG. 14B is another schematic diagram illustrating the first example of the positional relationship between the second flange of the rotor and the protrusion 2012 of the second magnetic stator substrate in the magnetic levitation device according to the embodiment of the present disclosure.

For example, according to an embodiment of the present disclosure, referring to FIG. 11A, in the above-mentioned situation (ii), a distance between the upper surface of the protrusion 2012 of the first magnetic stator substrate 201a and the upper surface of the first flange 101a is H and H≤⅘Ha, wherein Ha is the size of the first flange 101a in the axial direction Z of the stator 20; in this case, the rotor 10 is controlled stably by the stator 20, which can stably ensure that the protrusion 2012 and the magnetic levitation coil 2012c of the first magnetic stator substrate 201a apply an upward force along the axial direction Z of the stator 20 on the rotor 10 and ensure that the rotor 10 is rotated and levitated stably. Furthermore, in the case that H≤⅕Ha, it can more stably ensure that the protrusion 2012 and the magnetic levitation coil 2012c of the first magnetic stator substrate 201a apply an upward force along the axial direction Z of the stator 20 on the rotor 10 and ensure that the rotor 10 is rotated and levitated stably.

For example, referring to FIGS. 1 to 8 and FIG. 9A, according to an embodiment of the present disclosure, the at least three flanges 101 include a second flange 101b corresponding to the second magnetic stator substrate 201b, and a center line of the second flange 101b in the axial direction Z of the stator 20 is higher than a center line of the protrusion 2012 of the second magnetic stator substrate 201b in the axial direction Z of the stator 20. In this way, it can be ensured that the protrusion 2012 and the magnetic levitation coil 2012c of the second magnetic stator substrate 201b apply a downward force along the axial direction Z of the stator 20 on the rotor 10. For example, a relative relationship between the center line of the protrusion 2012 of the second magnetic stator substrate 201b in the axial direction Z of the stator 20 and the center line of the second flange 101b in the axial direction Z of the stator 20 can be adjusted by adjusting the current in the magnetic levitation coil 2012c wound on the protrusion 2012 of the first magnetic stator substrate 201a and/or adjusting the current in the magnetic levitation coil 2012c wound on the protrusion 2012 of the second magnetic stator substrate 201b.

FIGS. 14A-14B, 15A-15B, 16A-16B and 17A-17B respectively illustrate the positional relationship between the second flange 101b of the rotor 10 and the protrusion 2012 of the second magnetic stator substrate 201b in the magnetic levitation device according to the embodiment of the present disclosure; in these figures, the center line of the protrusion 2012 of the second magnetic stator substrate 201b in the axial direction Z of the stator 20 and the center line of the second flange 101b of the rotor 10 in the axial direction Z of the stator 20 are indicated by dotted lines.

For example, according to the embodiment of the present disclosure, the center line of the second flange 101b of the rotor 10 in the axial direction Z of the stator 20 is higher than the center line of the protrusion 2012 of the second magnetic stator substrate 201b in the axial direction Z of the stator 20, which includes one of the following situations. Situation (i) in the axial direction Z of the stator 20, an upper surface of the second flange 101b is higher than an upper surface of the protrusion 2012 of the second magnetic stator substrate 201b, and a lower surface of the second flange 101b is higher than (see FIG. 14A) or is at the same height as (see FIG. 14B) the upper surface of the protrusion 2012 of the second magnetic stator substrate 201b. Situation (ii), in the axial direction Z of the stator 20, the upper surface of the second flange 101b is higher than (see FIG. 15A) or is at the same height as (see FIG. 15b) the upper surface of the protrusion 2012 of the second magnetic stator substrate 201b, a lower surface of the protrusion 2012 of the second magnetic stator substrate 201b is lower than a lower surface of the second flange 101b, and the lower surface of the second flange 101b is lower than the upper surface of the protrusion 2012 of the second magnetic stator substrate 201b. Situation (iii), in the axial direction Z of the stator 20, the upper surface of the second flange 101b is higher than the upper surface of the protrusion 2012 of the second magnetic stator substrate 201b, and the lower surface of the protrusion 2012 of the second magnetic stator substrate 201b is higher than (see FIG. 16A) or is at the same height as (see FIG. 16B) the lower surface of the second flange 101b. Situation (iv), in the axial direction Z of the stator 20, the upper surface of the second flange 101*b* is at the same height as (see FIG. 17A) or is lower than (see FIG. 17B) the upper surface of the protrusion 2012 of the second magnetic stator substrate 201*b*, and the lower surface of the second flange 101*b* is higher than the lower surface of the protrusion 2012 of the second magnetic stator substrate 201*b*.

Figure 15A:
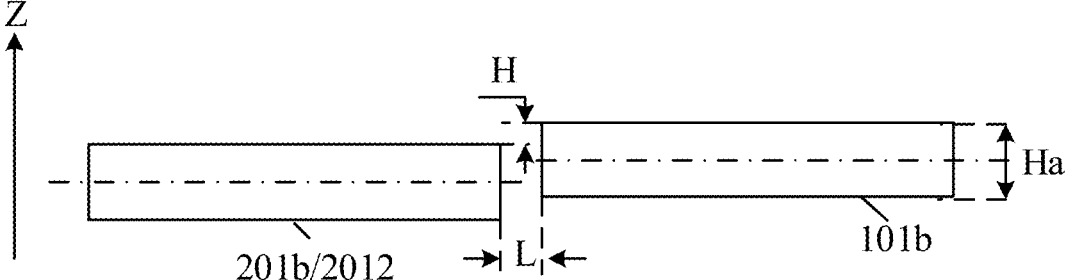
FIG. 15A is a schematic diagram illustrating a second example of a positional relationship between a second flange of a rotor and a protrusion 2012 of a second magnetic stator substrate in a magnetic levitation device according to an embodiment of the present disclosure.
Figure 15B:
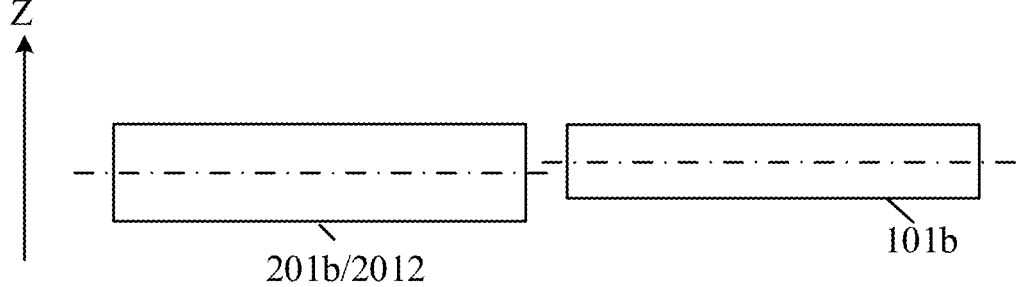
FIG. 15B is another schematic diagram illustrating the second example of the positional relationship between the second flange of the rotor and the protrusion 2012 of the second magnetic stator substrate in the magnetic levitation device according to the embodiment of the present disclosure.
Figure 16A:
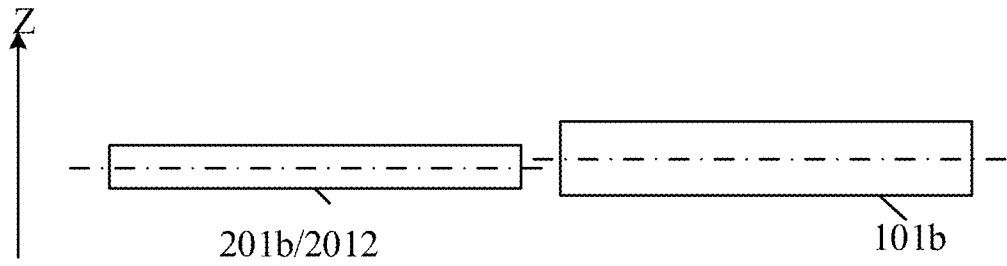
FIG. 16A is a schematic diagram illustrating a third example of a positional relationship between a second flange of a rotor and a protrusion 2012 of a second magnetic stator substrate in a magnetic levitation device according to an embodiment of the present disclosure.
Figure 16B:
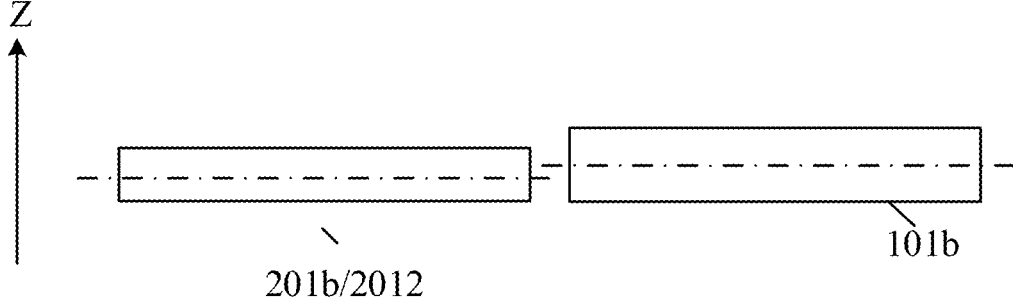
FIG. 16B is another schematic diagram illustrating the third example of the positional relationship between the second flange of the rotor and the protrusion 2012 of the second magnetic stator substrate in the magnetic levitation device according to the embodiment of the present disclosure.
Figure 17A:
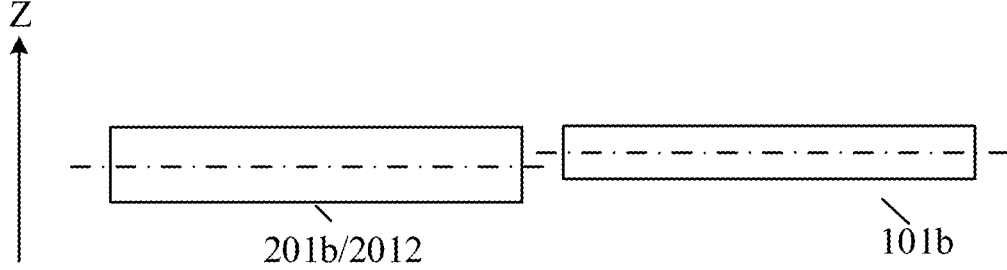
FIG. 17A is a schematic diagram illustrating a fourth example of a positional relationship between a second flange of a rotor and a protrusion 2012 of a second magnetic stator substrate in a magnetic levitation device according to an embodiment of the present disclosure.
Figure 17B:
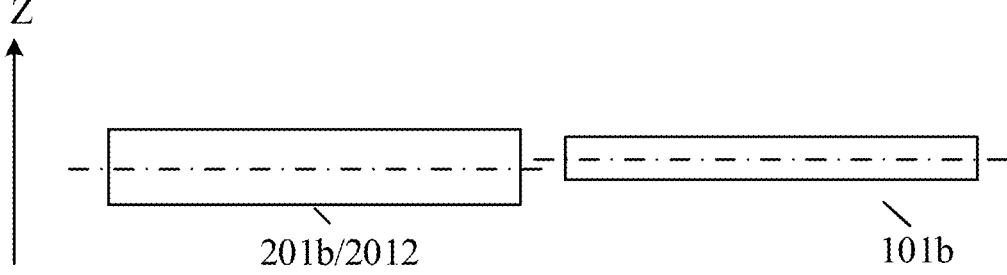
FIG. 17B is another schematic diagram illustrating the fourth example of the positional relationship between the second flange of the rotor and the protrusion 2012 of the second magnetic stator substrate in the magnetic levitation device according to the embodiment of the present disclosure.

For example, according to an embodiment of the present disclosure, referring to FIG. 15A, in the above-mentioned situation (ii), a distance between the upper surface of the second flange 101*b* and the upper surface of the protrusion 2012 of the second magnetic stator substrate 201*b* is H and H≤⅘Ha, wherein Ha is a size of the second flange 101*b* in the axial direction Z of the stator; in this case, the rotor 10 is controlled stably by the stator 20, which can stably ensure that the protrusion 2012 and the magnetic levitation coil 2012*c* of the second magnetic stator substrate 201*b* apply a downward force along the axial direction Z of the stator 20 on the rotor 10 and ensure that the rotor 10 is rotated and levitated stably. Furthermore, in the case that H≤⅕Ha, it can more stably ensure that the protrusion 2012 and the magnetic levitation coil 2012*c* of the second magnetic stator substrate 201*b* apply a downward force along the axial direction Z of the stator 20 on the rotor 10 and ensure that the rotor 10 is rotated and levitated stably.

For example, according to an embodiment of the present disclosure, referring to FIGS. 11A and 15A, a distance between each of the at least three magnetic stator substrates 201 and the corresponding flange 101 in a radial direction of the stator 20 is L, and a size of each of the at least two gaps 201' in the axial direction Z of the stator 20 is at least three times as great as L, so that the rotor 10 is controlled by the stator 20 more stably. For example, further, a size of each of the at least two gaps 201' in the axial direction Z of the stator 20 is at least five times as great as L. For example, further, the size of each of the at least two gaps 201' in the axial direction Z of the stator 20 is at least ten times as great as L. For example, the radial direction of the stator 20 is perpendicular to the axial direction Z of the stator 20.

For example, according to an embodiment of the present disclosure, referring to FIGS. 11A and 15A, the distance between each of the at least three magnetic stator substrates 201 and the corresponding flange 101 in the radial direction of the stator 20 is L and L≤Ha, wherein Ha is a size of the flange 101 in the axial direction Z of the stator 20, so that the rotor 10 can be controlled by the stator 20 more stably. Further, for example, L≤½Ha.

Figure 9E:
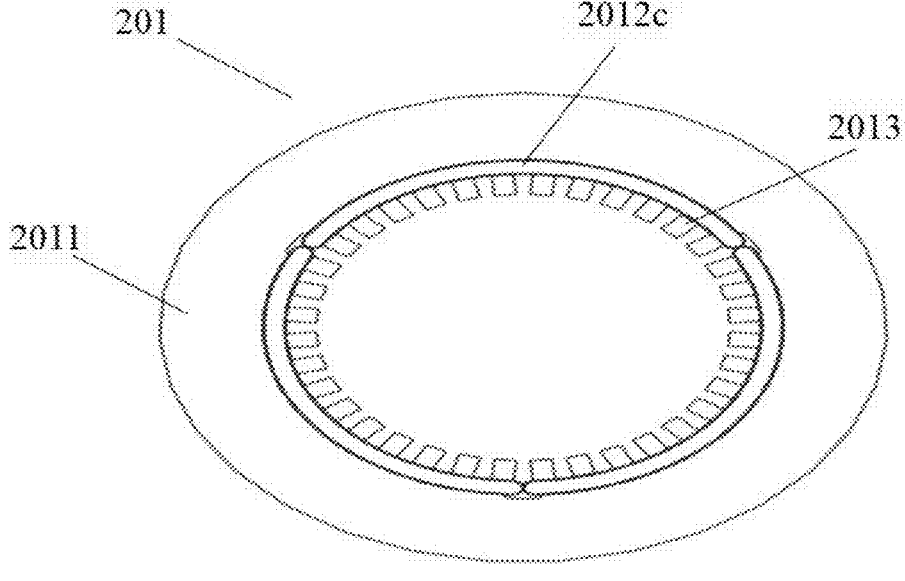
FIG. 9E is another schematic perspective diagram of a magnetic stator substrate of a magnetic levitation device according to an embodiment of the present disclosure.
Figure 9F:
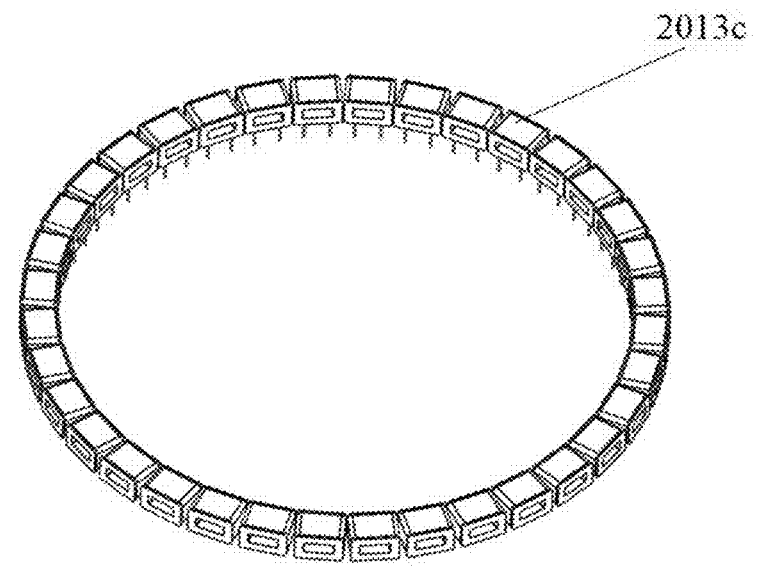
FIG. 9F is a schematic perspective diagram of a magnetic rotating coil of a magnetic levitation device according to an embodiment of the present disclosure.
Figure 10A:
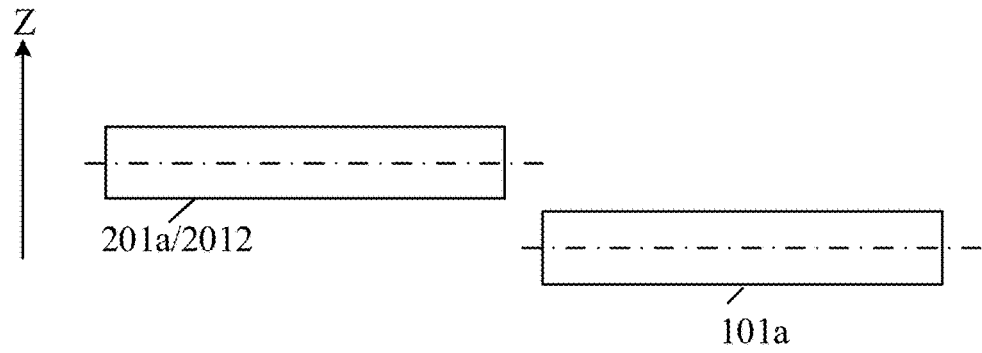
FIG. 10A is a schematic diagram illustrating a first example of a positional relationship between a protrusion 2012 of a first magnetic stator substrate 201a and a first flange of a rotor in a magnetic levitation device according to an embodiment of the present disclosure.
Figure 10B:
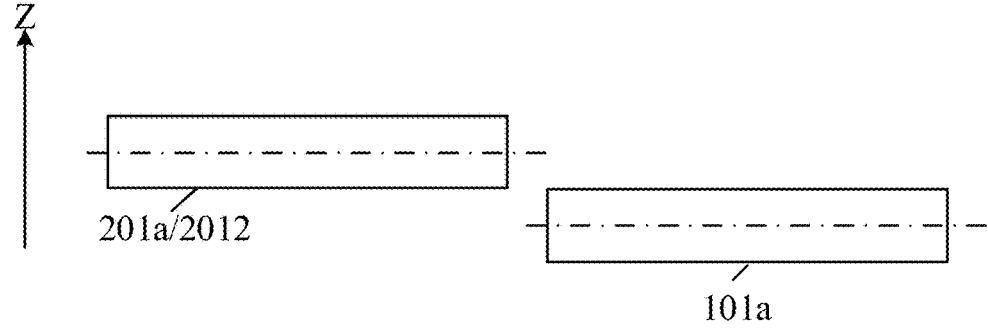
FIG. 10B is another schematic diagram illustrating the first example of the positional relationship between the protrusion 2012 of the first magnetic stator substrate 201a and the first flange of the rotor in the magnetic levitation device according to the embodiment of the present disclosure.

FIG. 9E is another schematic perspective diagram of the magnetic stator substrate of the magnetic levitation device according to the embodiment of the present disclosure; and FIG. 9F is a schematic perspective diagram of a magnetic rotating coil of a magnetic levitation device according to an embodiment of the present disclosure. For example, referring to FIGS. 2, 6 and 9E-9F, in the magnetic levitation device according to the embodiment of the present disclosure, at least one magnetic stator substrate 201 among the at least three magnetic stator substrates 201 includes a plurality of teeth 2013 which are connected with the substrate body 2011 and are protruded from the permanent magnet 202 and the guiding magnet 203 towards the rotor 10, and a magnetic rotating coil 2013*c* is wound on each of the teeth 2013. For example, the current flows through the magnetic rotating coil 2013*c*. The rotor 10 is rotated under the action of the teeth 2013 and the magnetic rotating coils 2013*c* wound thereon. For example, the magnitude of the current in the magnetic rotating coil 2013*c* can be adjusted, so that the rotating speed of the rotor 10 can be adjusted, which enhances the working flexibility of the magnetic levitation device according to the embodiment of the present disclosure. The at least one magnetic stator substrate 201 including the teeth 2013 and the magnetic rotating coils 2013*c* has the functions of both of magnetic rotation and magnetic levitation. For example, the magnetic levitation coil 2012*c* is farther from the rotor 10 than the magnetic rotating coil 2013*c*. Because a circumferential span of the magnetic levitation coil 2012*c* is greater than that of the magnetic rotating coil 2012*c*, the magnetic levitation coil 2012*c* is arranged farther from the rotor 10 than the magnetic rotating coil 2013*c*, so as to prevent the magnetic rotating coil 2013*c* from influencing a magnetic field distribution of the magnetic levitation coil 2012*c*. For example, the plurality of teeth 2013 are provided at an end of the protrusion 2012 facing towards the rotor 10.

For example, the at least one magnetic stator substrate 201 including the teeth 2013 and the magnetic rotating coils 2013*c* is the first magnetic stator substrate 201*a* or the second magnetic stator substrate 201*b*, or is neither the first magnetic stator substrate 201*a* nor the second magnetic stator substrate 201*b*, which is not limited in the embodiment of the present disclosure. For example, the magnetic levitation device according to the embodiment of the present disclosure includes another magnetic stator substrate in addition to the above-mentioned at least three magnetic stator substrates, and the another magnetic stator substrate only includes the teeth 2013 and the magnetic rotating coils 2013*c* but does not include the protrusions 2012 and the magnetic levitation coils 2012*c*, so that the another magnetic stator substrate only has the function of magnetic rotation.

For example, according to the embodiment of the present disclosure, the number of the at least one magnetic stator substrate 201 including the teeth 2013 and the magnetic rotating coils 2013*c* is one, and the one magnetic stator substrate 201 is the magnetic stator substrate located at the uppermost layer or the lowermost layer in the axial direction Z of the stator 20 among the at least three magnetic stator substrates 201. In this case, the processing of the stator 20 is simplified.

For example, according to the embodiment of the present disclosure, the number of the at least one magnetic stator substrate 201 including the teeth 2013 and the magnetic rotating coils 2013*c* is one, and the one magnetic stator substrate 201 is the magnetic stator substrate located at the middle layer in the axial direction Z of the stator 20 among the at least three magnetic stator substrates 201. In this case, a rotating force applied on the rotor 10 by the stator 20 is substantially located at the middle of the rotor 10 in the axial direction Z of the stator 20, so that the rotation of the rotor 10 is more stable.

For example, according to the embodiment of the present disclosure, the number of the at least one magnetic stator substrate 201 including the teeth 2013 and the magnetic rotating coil 2013*c* is an even number, and these magnetic stator substrates 201 are symmetrically arranged with respect to the center line of the stator 20 in the axial direction Z of the stator 20. In this case, an even number of magnetic stator substrates 201 including teeth 2013 and magnetic rotating coils 2013*c* are symmetrically arranged in the axial direction Z of the stator 20, so that the rotation of the rotor 10 is more stable. For example, according to the embodiment of the present disclosure, the number of the at least one magnetic stator substrate 201 including the teeth 2013 and the magnetic rotating coils 2013*c* is an odd number greater than 1, wherein one magnetic stator substrate 201 including the teeth 2013 and the magnetic rotating coils 2013*c* is the magnetic stator substrate 201 located at the middle layer in the axial direction Z of the stator 20 among the at least three magnetic stator substrates 201, while the remaining magnetic stator substrates 201 including the teeth 2013 and the magnetic rotating coils 2013*c* are symmetrically arranged with respect to the center line of the stator 20 in the axial direction Z of the stator 20, so that the rotation of the rotor 10 is more stable.

For example, referring to FIGS. 2, 6 and 9A, according to an embodiment of the present disclosure, the rotor 10 includes a rotor body 100 and at least three flanges 101 protruded from the rotor body 100 towards the stator 20; the at least three magnetic stator substrates 201 and the at least three flanges 101 are same in their amounts and are provided in one-to-one correspondence; the flange 101 corresponding to the above-described at least one magnetic stator substrate 201 has an end facing towards the at least one magnetic stator substrate 201, and the end is provided with a plurality of teeth 103. In this case, the teeth 2013 and the magnetic rotating coils 2013*c* can apply a rotating force on the rotor 10 in a better way, so that the rotor 10 is rotated in a highly efficient way.

According to an embodiment of the present disclosure, there is further provided a semiconductor processing equipment including the magnetic levitation device as described above.

In the field of semiconductor processing, semiconductor wafers or other semiconductor components to be processed will be subjected to semiconductor processing steps, such as Rapid Thermal Processing (RTP), vapor deposition (for example, Metal Organic Chemical Vapor Deposition, MOCVD), sputtering, cleaning, photoresist coating, etching and measuring. During these semiconductor processing steps, fragile silicon wafers or wafers of other semiconductor materials or other semiconductor components must be processed in a controlled ultra-clean atmosphere, such as vacuum, inert gas or processing gas. Micro-contaminations in the atmosphere lead to serious problems, because they may possibly be directly deposited on the semiconductor wafers or other semiconductor components to be processed, or may be deposited on the wafers or other semiconductor components along with the processing gas. Micro-particles on the wafers or other semiconductor components will cause contamination thereto, and semiconductor products made of contaminated wafers or other semiconductor components will involve defections. Therefore, the cleanliness level of the wafers or other semiconductor components to be processed is in direct correlation with the product yields, which in turn affects the final product costs. For example, in a semiconductor processing procedure, the pipelines filled with vacuum or inert gas are utilized to connect multiple chambers, and these chambers are vacuum chambers or chambers filled with inert gas and are dedicated to certain semiconductor processing steps. In the magnetic levitation device according to the embodiment of the present disclosure, there is no contact or mechanical friction between the rotor and the stator, so that the magnetic levitation device according to the embodiment of the present disclosure is quite suitable for the semiconductor processing equipment. For example, the magnetic levitation device according to the embodiment of the present disclosure is used as a supporting device in the semiconductor processing equipment. For example, the rotor of the magnetic levitation device according to the embodiment of the present disclosure supports a rotatable platform, which in turn supports a semiconductor wafer or other semiconductor components to be processed. As described above, the magnetic levitation device according to the embodiment of the present disclosure can provide a large axial support force; in this case, the magnetic levitation device according to the embodiment of the present disclosure can bear a rotatable platform with a considerable weight, so as to ensure a stable and uniform rotation of the rotatable platform, thereby favorably ensuring the qualification rate achieved by the semiconductor processing procedure.

The above are merely exemplary embodiments of the present disclosure and are not intended to limit the scope of protection of the present disclosure, which is determined by the appended claims.

What is claimed is:

1. A magnetic levitation device, comprising:
   a rotor; and
   a stator, wherein the stator surrounds the rotor, or, the rotor surrounds the stator,
   wherein:
   the stator comprises at least three magnetic stator substrates, a permanent magnet and a guiding magnet, the at least three magnetic stator substrates are spaced apart from each other in an axial direction of the stator to define at least two gaps in the axial direction of the stator, the permanent magnet and the guiding magnet are alternately arranged in the at least two gaps in the axial direction of the stator;
   each of the at least three magnetic stator substrates comprises a substrate body and a protrusion connected with the substrate body, the protrusion is protruded from the permanent magnet and the guiding magnet towards the rotor, and a magnetic levitation coil is wound on the protrusion; and
   the at least three magnetic stator substrates comprise a first magnetic stator substrate, wherein a protrusion and a magnetic levitation coil of the first magnetic stator substrate apply an upward force along the axial direction of the stator on the rotor, and a ratio of the number of the first magnetic stator substrate(s) to the total number of the at least three magnetic stator substrates is greater than or equal to 50%,
   wherein each of the at least three magnetic stator substrates comprise a plurality of the protrusions, the number of the first magnetic stator substrate(s) is at least two.

2. The magnetic levitation device according to claim 1, wherein the at least three magnetic stator substrates further comprise a second magnetic stator substrate, a protrusion and a magnetic levitation coil of the second magnetic stator substrate apply a downward force along the axial direction of the stator on the rotor, and the number of the first magnetic stator substrate(s) is greater than or equal to the number of the second magnetic stator substrate(s).

3. The magnetic levitation device according to claim 2, wherein:
   the rotor comprises a rotor body and at least three flanges protruded from the rotor body towards the stator;
   the number of the at least three magnetic stator substrates is equal to the number of the at least three flanges, and the at least three magnetic stator substrates are in one-to-one correspondence with the at least three flanges; and
   the at least three flanges comprise a first flange corresponding to the first magnetic stator substrate, and a center line of the protrusion of the first magnetic stator substrate in the axial direction of the stator is higher than a center line of the first flange in the axial direction of the stator.

4. The magnetic levitation device according to claim 3, wherein:

the center line of the protrusion of the first magnetic stator substrate in the axial direction is higher than the center line of the first flange in the axial direction comprises one of the following situations:

(i) in the axial direction of the stator, an upper surface of the protrusion of the first magnetic stator substrate is higher than an upper surface of the first flange, and a lower surface of the protrusion of the first magnetic stator substrate is higher than the upper surface of the first flange or is at the same height as the upper surface of the first flange;

(ii) in the axial direction of the stator, the upper surface of the protrusion of the first magnetic stator substrate is higher than the upper surface of the first flange or is at the same height as the upper surface of the first flange, and a lower surface of the first flange is lower than the lower surface of the protrusion of the first magnetic stator substrate, and the upper surface of the first flange is higher than the lower surface of the protrusion of the first magnetic stator substrate;

(iii) in the axial direction of the stator, the upper surface of the protrusion of the first magnetic stator substrate is higher than the upper surface of the first flange, and the lower surface of the first flange is higher than the lower surface of the protrusion of the first magnetic stator substrate or is at the same height as the lower surface of the protrusion of the first magnetic stator substrate; and (iv) in the axial direction of the stator, the upper surface of the protrusion of the first magnetic stator substrate is at the same height as the upper surface of the first flange or is lower than the upper surface of the first flange, and the lower surface of the protrusion of the first magnetic stator substrate is higher than the lower surface of the first flange.

5. The magnetic levitation device according to claim 4, wherein in the situation (ii), a distance between the upper surface of the protrusion of the first magnetic stator substrate and the upper surface of the first flange is H, and $H \leq \frac{4}{5}Ha$, wherein Ha is a size of the first flange in the axial direction of the stator.

6. The magnetic levitation device according to claim 3, wherein:

the at least three flanges comprise a second flange corresponding to the second magnetic stator substrate, and a center line of the second flange in the axial direction of the stator is higher than a center line of the protrusion of the second magnetic stator substrate in the axial direction of the stator.

7. The magnetic levitation device according to claim 6, wherein:

the center line of the second flange in the axial direction is higher than the center line of the protrusion of the second magnetic stator substrate in the axial direction comprises one of the following situations:

(i) in the axial direction of the stator, an upper surface of the second flange is higher than an upper surface of the protrusion of the second magnetic stator substrate, and a lower surface of the second flange is higher than the upper surface of the protrusion of the second magnetic stator substrate or is at the same height as the upper surface of the protrusion of the second magnetic stator substrate;

(ii) in the axial direction of the stator, the upper surface of the second flange is higher than the upper surface of the protrusion of the second magnetic stator substrate or is at the same height as the upper surface of the protrusion of the second magnetic stator substrate, and a lower surface of the protrusion of the second magnetic stator substrate is lower than the lower surface of the second flange, and the lower surface of the second flange is lower than the upper surface of the protrusion of the second magnetic stator substrate;

(iii) in the axial direction of the stator, the upper surface of the second flange is higher than the upper surface of the protrusion of the second magnetic stator substrate, and the lower surface of the protrusion of the second magnetic stator substrate is higher than the lower surface of the second flange or is at the same height as the lower surface of the second flange; and (iv) in the axial direction of the stator, the upper surface of the second flange is at the same height as the upper surface of the protrusion of the second magnetic stator substrate or is lower than the upper surface of the protrusion of the second magnetic stator substrate, and the lower surface of the second flange is higher than the lower surface of the protrusion of the second magnetic stator substrate.

8. The magnetic levitation device according to claim 7, wherein:

in the situation (ii), a distance between the upper surface of the second flange and the upper surface of the protrusion of the second magnetic stator substrate is H and $H \leq \frac{4}{5}Ha$, wherein Ha is a size of the second flange in the axial direction of the stator.

9. The magnetic levitation device according to claim 3, wherein:

a distance between each of the at least three magnetic stator substrates and a corresponding flange in a radial direction of the stator is L; and a size of each of the at least two gaps in the axial direction of the stator is at least three times as great as L.

10. The magnetic levitation device according to claim 3, wherein a distance between each of the at least three magnetic stator substrates and a corresponding flange in a radial direction of the stator is L and $L \leq Ha$, wherein Ha is a size of the flange in the axial direction of the stator.

11. The magnetic levitation device according to claim 2, wherein:

the number of the second magnetic stator substrate(s) is at least one.

12. The magnetic levitation device according to claim 1, wherein:

the number of the at least three magnetic stator substrates is four or more than four; and in the axial direction of the stator, opposite surfaces of two adjacent permanent magnets have the same magnetism.

13. The magnetic levitation device according to claim 1, wherein:

at least one magnetic stator substrate of the at least three magnetic stator substrates comprises a plurality of teeth, the plurality of teeth are connected with the substrate body and are protruded from the permanent magnet and the guiding magnet towards the rotor, and a magnetic rotating coil is wound on each of the plurality of teeth;

the magnetic levitation coil is arranged farther from the rotor than the magnetic rotating coil; and the plurality of teeth are arranged at an end of the protrusion facing towards the rotor.

14. The magnetic levitation device according to claim 13, wherein the number of the at least one magnetic stator substrate is one, and the one magnetic stator substrate is a magnetic stator substrate located at an uppermost layer or a lowermost layer in the axial direction of the stator among the at least three magnetic stator substrates; or the number of the at least one magnetic stator substrate is one, and the one magnetic stator substrate is a magnetic stator substrate located at a middle layer in the axial direction of the stator among the at least three magnetic stator substrates.

15. The magnetic levitation device according to claim 13, wherein:

the number of the at least one magnetic stator substrate is an even number, and the even number of magnetic stator substrates are symmetrically arranged with relative to a central line of the stator in the axial direction of the stator; or the number of the at least one magnetic stator substrate is an odd number greater than 1, wherein one of the at least one magnetic stator substrate is the magnetic stator substrate located at a middle layer in the axial direction of the stator among the at least three magnetic stator substrates, and the other magnetic stator substrates of the at least one magnetic stator substrate are symmetrically arranged with relative to a central line of the stator in the axial direction of the stator.

16. The magnetic levitation device according to claim 13, wherein:

the rotor comprises a rotor body and at least three flanges protruded from the rotor body towards the stator;

the number of the at least three magnetic stator substrates is equal to the number of the at least three flanges, and the at least three magnetic stator substrates are in one-to-one correspondence with the at least three flanges; and an end of the flange corresponding to the at least one magnetic stator substrate that faces towards the at least one magnetic stator substrate has a plurality of teeth.

17. The magnetic levitation device according to claim 1, wherein among at least two gaps, the permanent magnet is arranged in an odd-numbered gap counting from top to bottom in the axial direction of the stator, and the guiding magnet is arranged in an even-numbered gap counting from top to bottom in the axial direction of the stator.

18. The magnetic levitation device according to claim 1, wherein:

the permanent magnet is in direct contact with the magnetic stator substrate adjacent thereto, or the permanent magnet is spaced apart from the magnetic stator substrate adjacent thereto by an air gap, or a guiding magnet piece is inserted between the permanent magnet and the magnetic stator substrate adjacent thereto.

19. The magnetic levitation device according to claim 1, wherein:

the guiding magnet is in direct contact with the magnetic stator substrate adjacent thereto, or the guiding magnet is spaced apart from the magnetic stator substrate adjacent thereto by an air gap, or a guiding magnet piece is inserted between the guiding magnet and the magnetic stator substrate adjacent thereto.

20. A semiconductor processing equipment, comprising a magnetic levitation device, the magnetic levitation device comprising:

a rotor; and a stator, wherein the stator surrounds the rotor, or, the rotor surrounds the stator, wherein:

the stator comprises at least three magnetic stator substrates, a permanent magnet and a guiding magnet, the at least three magnetic stator substrates are spaced apart from each other in an axial direction of the stator to define at least two gaps in the axial direction of the stator, the permanent magnet and the guiding magnet are alternately arranged in the at least two gaps in the axial direction of the stator;

each of the at least three magnetic stator substrates comprises a substrate body and a protrusion connected with the substrate body, the protrusion is protruded from the permanent magnet and the guiding magnet towards the rotor, and a magnetic levitation coil is wound on the protrusion; and the at least three magnetic stator substrates comprise a first magnetic stator substrate, wherein a protrusion and a magnetic levitation coil of the first magnetic stator substrate apply an upward force along the axial direction of the stator on the rotor, and a ratio of the number of the first magnetic stator substrate(s) to the total number of the at least three magnetic stator substrates is greater than or equal to 50%, wherein each of the at least three magnetic stator substrates comprise a plurality of the protrusions, the number of the first magnetic stator substrate(s) is at least two.

* * * * *